(12) United States Patent
Abe et al.

(10) Patent No.: US 7,227,566 B2
(45) Date of Patent: Jun. 5, 2007

(54) COMMUNICATION APPARATUS AND TV CONFERENCE APPARATUS

(75) Inventors: Yoshitaka Abe, Tokyo (JP); Hideharu Fujiyama, Chiba (JP); Akira Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 10/934,820

(22) Filed: Sep. 3, 2004

(65) Prior Publication Data

US 2005/0093970 A1 May 5, 2005

(30) Foreign Application Priority Data

Sep. 5, 2003 (JP) ............................. 2003-314541

(51) Int. Cl.
*H04N 7/15* (2006.01)
(52) U.S. Cl. ................................ 348/14.05; 348/14.08
(58) Field of Classification Search .. 348/14.01–14.16; 379/202.01; 381/92
See application file for complete search history.

(56) References Cited

U.S. PATENT DOCUMENTS

| | | | | |
|---|---|---|---|---|
| 4,456,789 A | * | 6/1984 | Groves et al. | ......... 379/202.01 |
| 5,524,059 A | * | 6/1996 | Zurcher | ....................... 381/92 |
| 5,686,957 A | | 11/1997 | Baker | |
| 6,593,956 B1 | | 7/2003 | Potts et al. | |
| 6,931,113 B2 | * | 8/2005 | Ortel | ..................... 379/202.01 |
| 2002/0140804 A1 | | 10/2002 | Colmenarez et al. | |
| 2002/0154211 A1 | * | 10/2002 | Takaki et al. | ............ 348/14.08 |
| 2003/0059061 A1 | * | 3/2003 | Tsuji et al. | ............ 379/202.01 |
| 2003/0160862 A1 | * | 8/2003 | Charlier et al. | .......... 348/14.08 |
| 2003/0184645 A1 | * | 10/2003 | Biegelsen et al. | ......... 348/14.1 |

FOREIGN PATENT DOCUMENTS

| | | |
|---|---|---|
| EP | 0 356 105 | 2/1990 |
| EP | 1 045 586 | 10/2000 |
| JP | 2 52581 | 2/1990 |
| JP | 11331827 A * | 11/1999 |
| JP | 2000 350192 | 12/2000 |
| JP | 2002 516535 | 6/2002 |
| WO | WO 02/03754 | 1/2002 |

* cited by examiner

*Primary Examiner*—Stella Woo
(74) *Attorney, Agent, or Firm*—Frommer Lawrence & Haug LLP; William S. Frommer; Thomas F. Presson

(57) ABSTRACT

Provision of a communication apparatus and a TV conference apparatus able to take a picture of a speaker automatically and correctly. A sound analyzer selects a speaker correctly. A voiceprint authentication portion authenticates whether or not a voiceprint of the speaker is registered. When the selection of the speaker and the voiceprint authentication coincide an imaging direction adjusting portion drives a TV camera on the basis of the previously registered condition.

24 Claims, 26 Drawing Sheets

WHEN SOUND SOURCE IS IN FRONT OF MICROPHONE

WHEN SOUND SOURCE IS IN THE DIRECTION OF 60 DEGREES FROM THE FRONT OF MICROPHONE

WHEN SOUND SOURCE IS IN THE DIRECTION OF 120 DEGREES FROM THE FRONT OF MICROPHONE

WHEN SOUND SOURCE IS IN THE DIRECTION OF 180 DEGREES FROM THE FRONT OF MICROPHONE

FIG. 9

INITIAL OPERATION
(1) MEASUREMENT OF SURROUNDING NOISE (FLOOR NOISE)
(2) SETTING OF CHAIRMAN
(3) SENSITIVITY DIFFERENCE ADJUSTMENT

NORMAL OPERATION
(1) SELECT AND SWITCH PROCESSING OF MICROPHONE
(2) DISPLAY PROCESSING OF SELECTED MICROPHONE
(3) BASIC PROCESSING
   A, BAND SEPARATION OF SOUND PICKUP SIGNALS OF MICROPHONES AND LEVEL CONVERSION ROCESSING
   B, PROCESSING FOR JUDGMENT OF START AND END OF SPEECH
   C, PROCESSING FOR DETECTION OF MICROPHONE IN DIRECTION OF SPEAKING PARTY
   D, PROCESSING FOR JUDGMENT OF TIMING OF SWITCHING OF MICROPHONE IN DIRECTION OF SPEAKING PARTY
   E, MEASUREMENT OF FLOOR NOISE IN NORMAL STATE

SELECTION SWITCH PROCESSING OF MICROPHONE SIGNAL

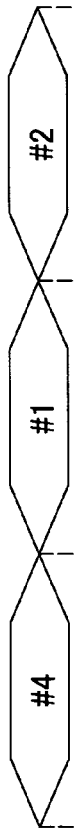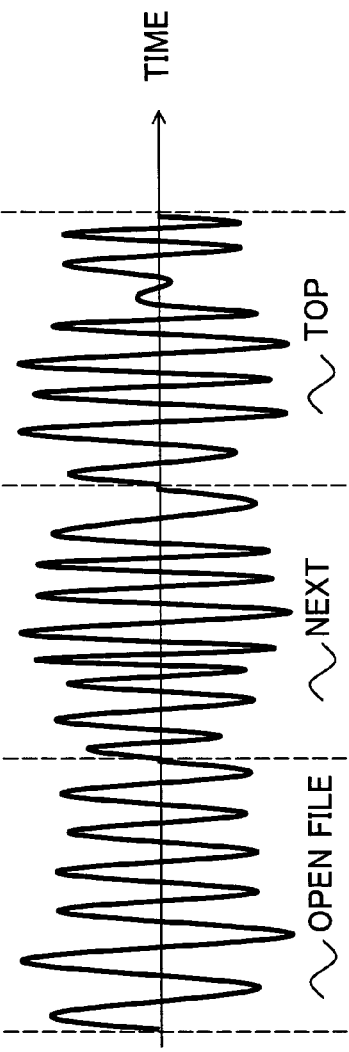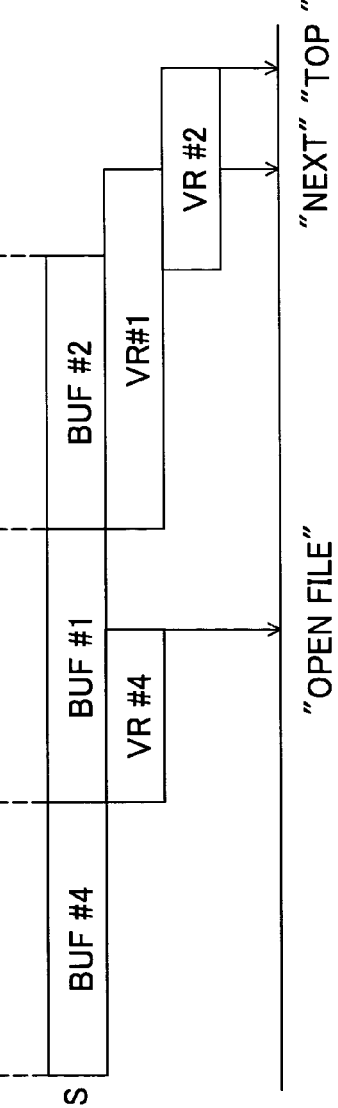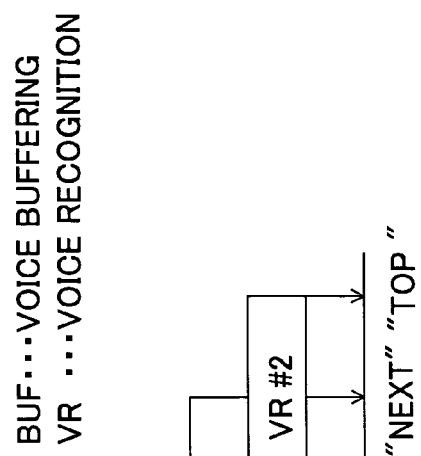
FIG. 20A MC_SEL
FIG. 20B
FIG. 20C PROSESS
FIG. 20D

COMMUNICATION APPARATUS AND TV CONFERENCE APPARATUS

BACKGROUND OF THE INVENTION

1. Field of the Invention

The present invention relates to an integral microphone and speaker configuration type communication apparatus suitable for use for example when a plurality of conference participants in two conference rooms hold a conference by voice. More particularly, the present invention relates to a communication apparatus, a conference apparatus and an imaging-condition adjustment method, wherein a microphone using a speaker is correctly selected, preferably, a voice authentication is further carried out, and then an area (region or space) positioned the microphone correctly selected and voice-authenticated can be imaged.

2. Description of the Related Art

A TV conference system has been used to enable conference participants in two conference rooms at distant locations to hold a conference. A TV conference system captures images of the conference participants in the conference rooms by imaging means, picks up their voices by microphones, sends the images captured by the imaging means and the voices picked up by the microphones through a communication channel, displays the captured images on display units of television receivers of the conference rooms of the other parties, and outputs the picked up voices from speakers.

In such a TV conference system, it suffers from the disadvantage that in each conference room, it is difficult to pick up the voices of the speaking parties at positions distant from the imaging means and the microphones. As a means for dealing with this, sometimes a microphone is provided for each conference participant. Further, it also suffers from the disadvantage that the voices output from the speakers of the television receivers are hard for conference participants at positions distant from the speakers to hear.

Japanese Unexamined Patent Publication (Kokai) No. 2003-87887 and Japanese Unexamined Patent Publication (Kokai) No. 2003-87890 disclose, in addition to a usual TV conference system providing video and audio for TV conferences in conference rooms at distant locations, a voice input/output system integrally configured by microphones and speakers having the advantages that the voices of conference participants in the conference rooms of the other parties can be clearly heard from the speakers and there is little effect from noise in the individual conference rooms or the load of echo cancellers is light.

The voice input/output systems disclosed in the above Publications are utilized as means for supplementing a TV conference system for providing video and audio.

SUMMARY OF THE INVENTION

An object of the present invention is to provide an improved communication apparatus and a conference apparatus, on performance, cost, size, compatibility to a use-environment (surroundings), and handling, as a means for using bi-directional communication, and an imaging-condition adjustment method.

Particularly, an object of the present invention is to provide a communication apparatus, a conference apparatus and an imaging-condition adjustment method, wherein a microphone using a speaker is correctly selected, preferably, a voice authentication is further carried out, and then an area (or space or region) positioned the microphone correctly selected and voice-authenticated can be imaged.

According to the present invention, there is provided a communication apparatus including: a plurality of microphones; a microphone signal selecting means for selecting a signal among a plurality of signals picked up by the plurality of microphones; and an imaging direction adjusting means for controlling an imaging condition of an imaging means in response to an imaging condition information corresponding to a microphone picked up the signal selected by the microphone signal selecting means.

The imaging condition information may include information indicating the imaging direction of the imaging means, and the imaging direction adjusting means may control the imaging direction of the imaging means in response to the information indicating the imaging direction.

The imaging condition information may include information for zooming the imaging means, and the imaging direction adjusting means may control the zoom of the imaging means in response to the information for zooming the imaging means.

The imaging condition information may include information indicating a speaker positioned at a portion where the imaging means takes a picture, and the imaging direction adjusting means may add the information indicating the speaker to the picture taken by the imaging means.

The communication apparatus may include a voiceprint authenticating means for carrying out a voiceprint authentication whether or not the selected microphone pick-up signal coincides with a previously registered voiceprint.

The imaging direction adjusting means may control the imaging condition of the imaging means in response to the imaging condition information corresponding to the microphone picked up the signal selected by the microphone signal selecting means.

The imaging direction adjusting means may set a status of the imaging means to a default status when the voiceprint authenticating means does not authenticate the selected microphone pick-up signal.

The imaging direction adjusting means may not change the imaging condition of the imaging means when set as the default status.

The imaging direction adjusting means may set the imaging condition of the imaging means to an initial imaging condition when set as the default status.

The imaging direction adjusting means may set the imaging condition of the imaging means to an imaging condition for taking a picture of a chairman previously registered, as the initial imaging condition.

The communication apparatus may include a gain variable type amplifying means for amplifying the signal picked up by the microphone and having a variable gain, and an amplifier gain adjusting means. The amplifier gain adjusting means may set a gain of the gain variable type amplifying means corresponding to the microphone indicating the selected signal to a first gain having a large value, when the voiceprint authenticating means authenticates the selected microphone pick-up signal.

The amplifier gain adjusting means may set the gain of the gain variable type amplifying means corresponding to the microphone indicating the selected signal to a second gain having a small value, when the voiceprint authenticating means does not authenticate the selected microphone pick-up signal.

The amplifier gain adjusting means may set the gain of the gain variable type amplifying means corresponding to the microphone indicating the selected signal to a third gain having an average and equal to a gain of other gain variable type amplifying means, when the termination of the microphone selection by the microphone signal selecting means is detected.

The amplifier gain adjusting means may set the gain of the gain variable type amplifying means corresponding to the microphone indicating the selected signal to a third gain having an average and equal to a gain of other gain variable type amplifying means, when the termination of the microphone selection by the microphone signal selecting means is detected.

Preferably, the plurality of microphones are arranged radially at equal angle. The communication apparatus may include a sound outputting means arranged at equal distance to the plurality of microphones and adjacent to the plurality of microphones.

The microphone signal selecting means may detect a sound source direction from the signal detected by the microphone.

According to the present invention, there is also provided a conference apparatus including: a plurality of microphones; an imaging means adjustable an imaging condition: a microphone signal selecting means for selecting a signal among a plurality of signals picked up by the plurality of microphones; and an imaging direction adjusting means for controlling the imaging condition of the imaging means in response to an imaging condition information corresponding to a microphone picked up the signal selected by the microphone signal selecting means.

According to the present invention, there is further provided a method of adjusting an imaging condition including: a step of selecting a signal among a plurality of signals picked up by a plurality of microphones; and a step of controlling an imaging condition of an imaging means in response to an imaging condition information corresponding to a microphone picked up the signal selected in the selecting step.

The method may include a voiceprint authenticating step for carrying out a voiceprint authentication whether or not the selected microphone pick-up signal coincides with a previously registered voiceprint. In the imaging direction adjusting step the imaging condition of the imaging means is controlled in response to the imaging condition information corresponding to the microphone picked up the signal selected by the microphone signal selecting means.

BRIEF DESCRIPTION OF THE DRAWINGS

These and other objects and features of the present invention will become clearer from the following description of the preferred embodiments given with reference to the accompanying drawings, in which:

FIG. 9 is a chart schematically showing the overall content of processing in the first digital signal processor;

FIG. 20 is a graph showing a processing in a voiceprint authentication portion illustrated in FIG. 19;

DESCRIPTION OF THE PREFERRED EMBODIMENTS

First, an example of the application of the integral microphone and speaker configuration type communication apparatus (hereinafter referred to as the "communication apparatus") of the present invention will be explained.

Figure 1A:
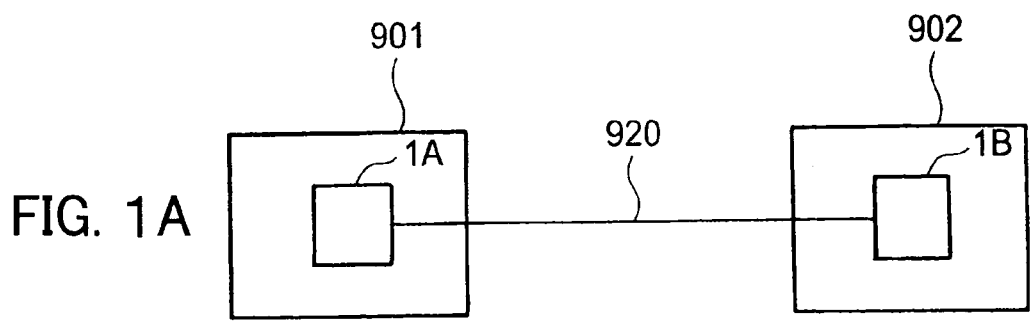
FIG. 1A is a view schematically showing a conference system as an example to which an integral microphone and speaker configuration type communication apparatus (communication apparatus) of the present invention is applied.
Figure 1B:
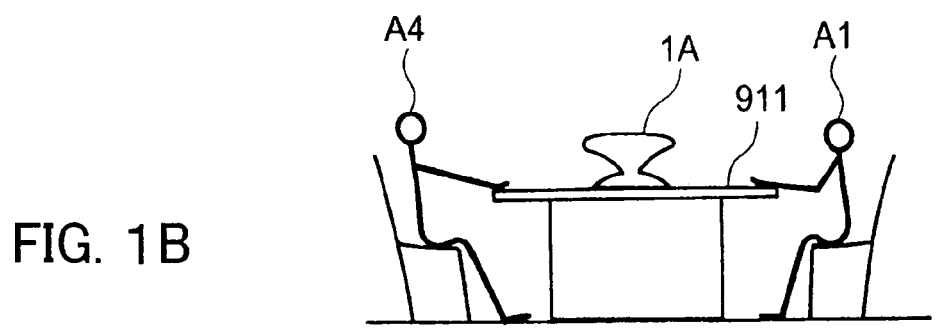
FIG. 1B is a view of a state where the communication apparatus in FIG. 1A is placed.
Figure 1C:
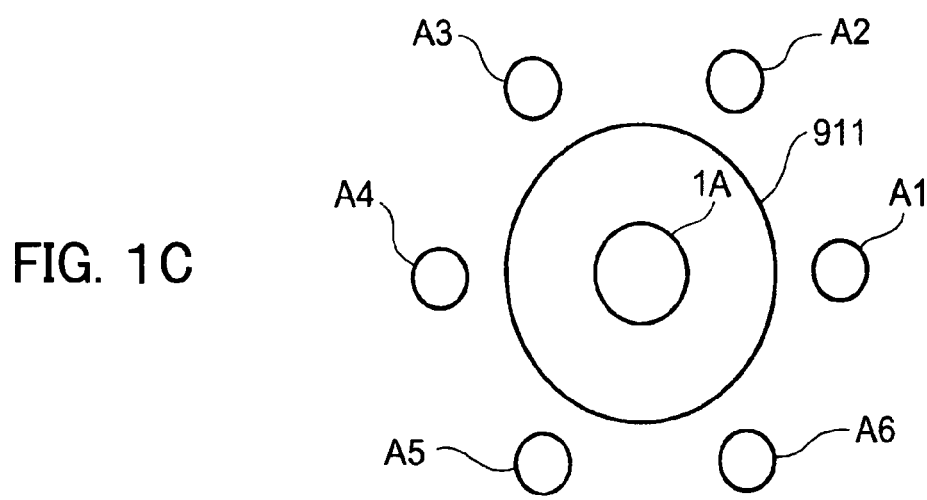
FIG. 1C is a view of an arrangement of the communication apparatus placed on a table and conference participants.

FIGS. 1A to 1C are views of the configuration showing an example to which the communication apparatus of the present invention is applied.

As illustrated in FIG. 1A, communication apparatuses 1A and 1B are disposed in two conference rooms 901 and 902 at distant locations. These communication apparatuses 1A and 1B are connected by a telephone line 920.

As illustrated in FIG. 1B, in the two conference rooms 901 and 902, the communication apparatuses 1A and 1B are placed on tables 911 and 912. Note, in FIG. 1B, for simplification of the illustration, only the communication apparatus 1A in the conference room 901 is illustrated. The communication apparatus 1B in the conference room 902 is the same however. A perspective view of the outer appearance of the communication apparatuses 1A and 1B is given in FIG. 2.

As illustrated in FIG. 1C, a plurality of (six in the present embodiment) conference participants A1 to A6 are positioned around each of the communication apparatuses 1A and 1B. Note, in FIG. 1C, for simplification of the illustration, only the conference participants around the communication apparatus 1A in the conference room 901 are illustrated. The arrangement of the conference participants located around the communication apparatus 1B in the other conference room 902 is the same however.

The communication apparatus of the present invention enables communication (questions and answers) by voice between for example the two conference rooms 901 and 902 via the telephone line 920.

Usually, a conversation via the telephone line 920 is carried out between one speaker and another, that is, one-to-one, but in the communication apparatus of the present invention, a plurality of conference participants A1 to A6 can converse with each other by using one telephone line 920. Note that although details will be explained later, in order to avoid congestion of audio, the parties speaking at the same time (same time period) are limited to one at each side.

The communication apparatus of the present invention handles only audio (speech), so only transmits audio via the telephone line 920. In other words, a large amount of image data is not transmitted as in a TV conference system. Further, the communication apparatus of the present invention compresses the speech of the conference participants for transmission, so the transmission load of the telephone line 920 is light.

First Embodiment

The configuration of the communication apparatus according to a first embodiment of the present invention will be explained first referring to FIG. 2 to FIG. 4.

Figure 2:
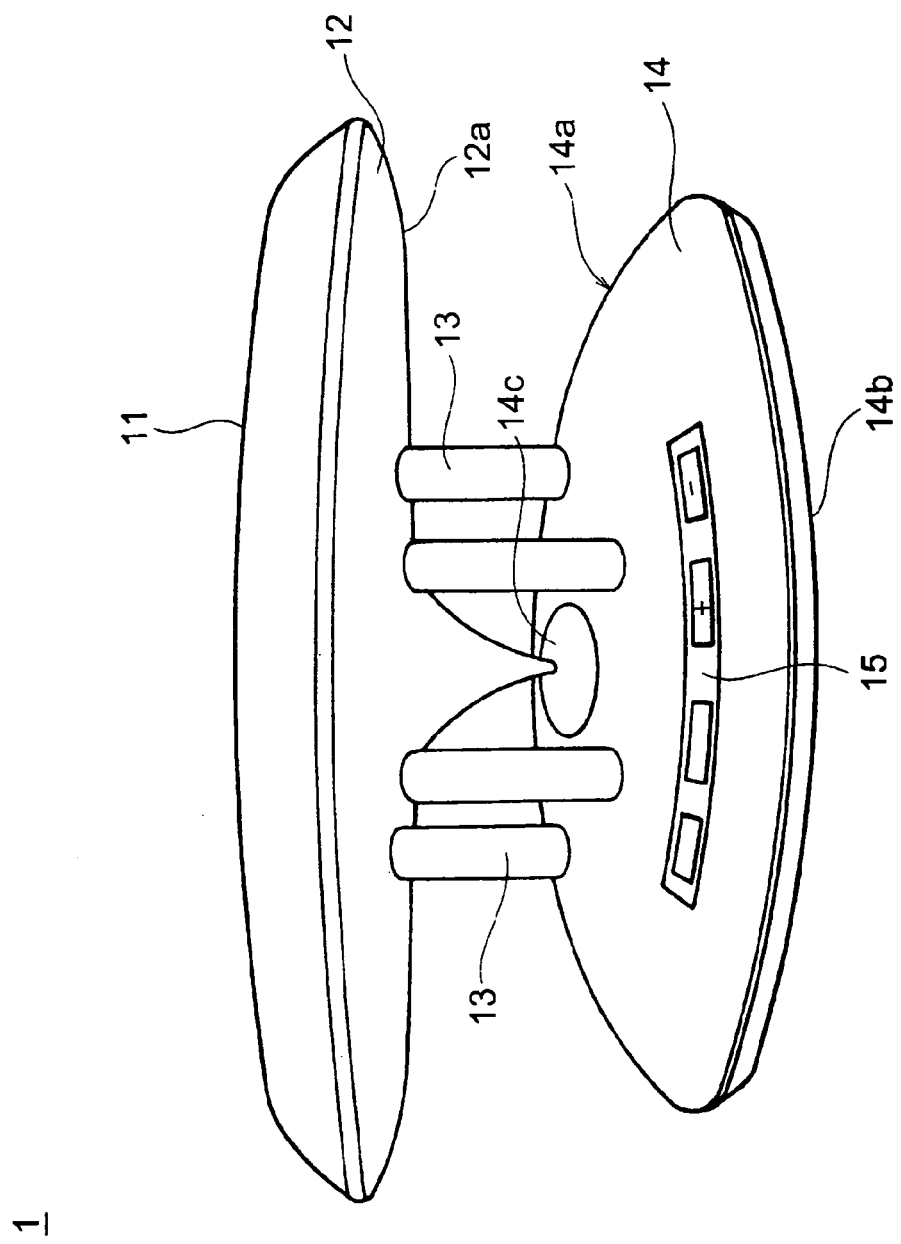
FIG. 2 is a perspective view of the communication apparatus of an embodiment of the present invention.

FIG. 2 is a perspective view of the communication apparatus according to an embodiment of the present invention. FIG. 3 is a sectional view of the communication apparatus illustrated in FIG. 2. FIG. 4 is a plan view of a microphone electronic circuit housing of the communication apparatus illustrated in FIG. 1 and a plan view along a line X-X-Y of FIG. 3.

As illustrated in FIG. 2, the communication apparatus 1 has an upper cover 11, a sound reflection plate 12, a coupling member 13, a speaker housing 14, and an operation unit 15.

Figure 3:
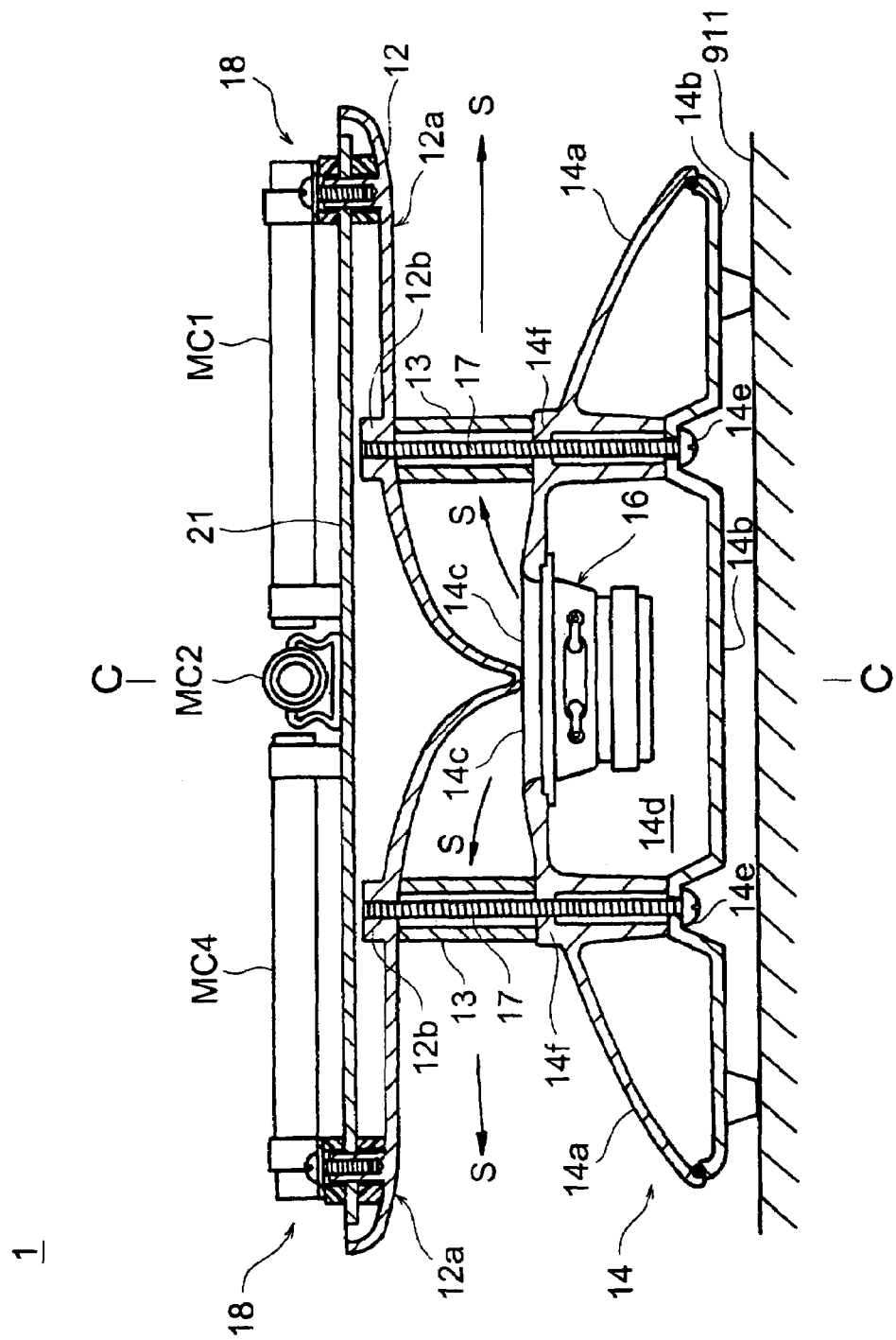
FIG. 3 is a sectional view of the inside of the communication apparatus illustrated in FIG. 2.

As illustrated in FIG. 3, the speaker housing 14 has a sound reflection surface 14a, a bottom surface 14b, and an upper sound output opening 14c. A receiving and reproduction speaker 16 is housed in a space surrounded by the sound reflection surface 14a and the bottom surface 14b, that is, an inner cavity 14d. The sound reflection plate 12 is arranged above the speaker housing 14. The speaker housing 14 and the sound reflection plate 12 are connected by the coupling member 13.

A restraint member 17 passes through the coupling member 13. The restraint member 17 restrains the space between a restraint member bottom fixing portion 14e of the bottom surface 14b of the speaker housing 14 and a restraint member fixing portion 12b of the sound reflection plate 12. Note that the restraint member 17 only passes through a restraint member passage 14f of the speaker housing 14. The reason why the restraint member 17 passes through the restraint member passage 14f and does not restrain it is that the speaker housing 14 vibrates by the operation of the speaker 16 and that the vibration thereof is not restricted around the upper sound output opening 14c.

Speaker

Speech by a speaking party of the other conference room passes through the receiving and reproduction speaker 16 and upper sound output opening 14c and is diffused along the space defined by the sound reflection surface 12a of the sound reflection plate 12 and the sound reflection surface 14a of the speaker housing 14 to the entire 360 degree orientation around an axis C—C. The cross-section of the sound reflection surface 12a of the sound reflection plate 12 is shown as a loose trumpet type arc as illustrated. The cross-section of the sound reflection surface 12a forms the illustrated sectional shape over 360 degrees (entire orientation) around the axis C—C. Similarly, the cross-section of the sound reflection surface 14a of the speaker housing 14 is shown as a loose convex shape as illustrated. The cross-section of the sound reflection surface 14a forms the illustrated sectional shape over 360 degrees (entire orientation) around the axis C—C.

The sound S output from the receiving and reproduction speaker 16 passes through the upper sound output opening 14c, passes through a sound output space defined by the sound reflection surface 12a and the sound reflection surface 14a and having a trumpet-like cross-section, is diffused along the surface of the table 911 on which the communication apparatus 1 is placed in the entire orientation of 360 degrees around the axis C—C, and is heard with an equal volume by all conference participants A1 to A6. In the present embodiment, the surface of the table 911 is utilized as part of the sound propagating means. The state of diffusion of the sound S output from the receiving and reproduction speaker 16 is shown by the arrows.

The sound reflection plate 12 supports a printed circuit board 21. The printed circuit board 21, as illustrated planarly in FIG. 4, mounts the microphones MC1 to MC6 of the microphone electronic circuit housing 2, light emitting diodes LEDs 1 to 6, a microprocessor 23, a codec 24, a first digital signal processor (DSP) 25, a second digital signal processor (DSP) 26, an A/D converter block 27, a D/A converter block 28, an amplifier block 29, and other various types of electronic circuits. The sound reflection plate 12 also functions as a member for supporting the microphone electronic circuit housing 2.

The printed circuit board 21 is provided with dampers 18 for absorbing vibration from the receiving and reproduction speaker 16 so as to prevent vibration from the receiving and reproduction speaker 16 from being transmitted through the sound reflection plate 12, entering the microphones MC1 to MC6 etc., and becoming noise. Each damper 18 is comprised by a screw and a buffer material such as a vibration-absorbing rubber between the screw and the printed circuit board 21. The buffer material is fastened by the screw to the printed circuit board 21. Namely, the vibration transmitted from the receiving and reproduction speaker 16 to the printed circuit board 21 is absorbed by the buffer material. As a result, the microphones MC1 to MC6 are not affected by sound from the speaker 16.

Arrangement of Microphones

Figure 4:
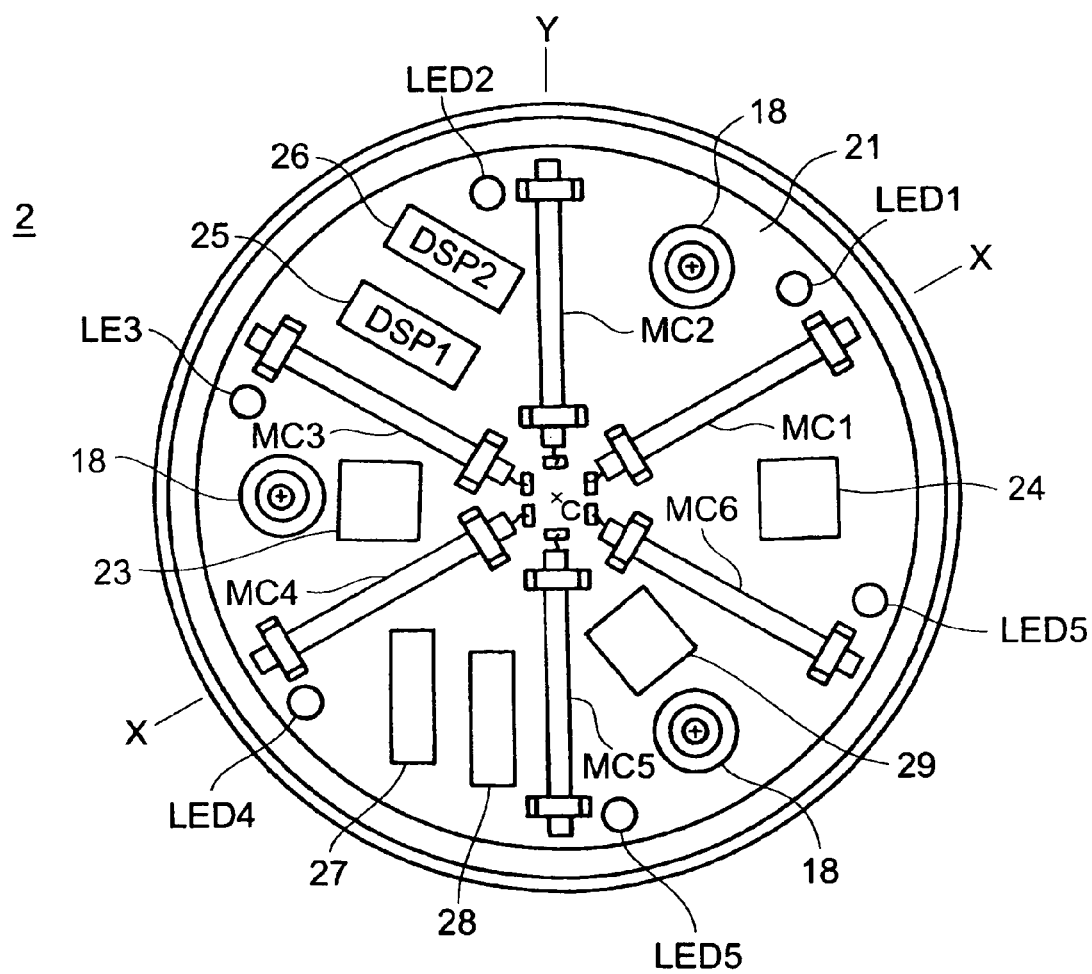
FIG. 4 is a plan view of a microphone electronic circuit housing with the upper cover detached in the communication apparatus illustrated in FIG. 2.

As illustrated in FIG. 4, six microphones MC1 to MC6 are located (arranged) radially at equal angles, at intervals of 60 degrees in the present embodiment, from the center axis C of the printed circuit board 21. Each microphone has single directivity. The characteristics thereof will be explained later. Each of the microphones MC1 to MC6 is supported by a first microphone support member 22a and a second microphone support member 22b both having flexibility or resiliency so that it can freely rock (illustration is made for only the first and second microphone support members 22a and 22b of the microphone MC1 for simplifying the illustration). In addition to the measure of preventing the influence of vibration from the receiving and reproduction speaker 16 by the dampers 18 using the above buffer materials, by preventing the influence of vibration from the receiving and reproduction speaker 16 by absorbing the vibration of the printed circuit board 21 vibrating by the vibration from the receiving and reproduction speaker 16 by the first and second microphone support members 22a and 22b having flexibility or resiliency, noise of the receiving and reproduction speaker 16 is avoided.

As illustrated in FIG. 3, the receiving and reproduction speaker 16 is oriented vertically with respect to the center axis C—C of the plane in which the microphones MC1 to MC6 are located (oriented (directed) upward in the present embodiment). By such an arrangement of the receiving and reproduction speaker 16 and the six microphones MC1 to MC6, the distances between the receiving and reproduction speaker 16 and the microphones MC1 to MC6 become equal and the audio from the receiving and reproduction speaker 16 arrives at the microphones MC1 to MC6 with almost the same volume and same phase. However, due to the configuration of the sound reflection surface 12a of the sound reflection plate 12 and the sound reflection surface 14a of the speaker housing 14, the sound of the receiving and reproduction speaker 16 is prevented from being directly input to the microphones MC1 to MC6. In addition, as explained above, by using the dampers 18 using the buffer materials and the first and second microphone support members 22a and 22b having flexibility or resiliency, the influence of the vibration of the receiving and reproduction speaker 16 is reduced. The conference participants A1 to A6, as illustrated in FIG. 1C, are usually positioned at almost equal intervals in the 360 degree direction of the communication apparatus 1 in the vicinity of the microphones MC1 to MC6 arranged at intervals of 60 degrees.

Light Emission Diodes

As an example of the means for notification of the determination of the speaking party explained later (microphone selection result displaying means 30), light emission diodes LED1 to LED6 are arranged in the vicinity of the microphones MC1 to MC6. The light emission diodes LED1 to LED6 have to be provided so as to be able be viewed from all conference participants A1 to A6 even in a state where the upper cover 11 is attached. Accordingly, the upper cover 11 is provided with a transparent window so that the light emission states of the light emission diodes LED1 to LED6 can be viewed. Naturally openings can also be provided at the portions of the light emission diodes LED1 to LED6 in the upper cover 11, but the use of the transparent window is preferred from the viewpoint for preventing dust from entering the microphone electronic circuit housing 2.

In order to perform the various types of signal processing explained later, the printed circuit board 21 is provided with the first digital processor (DSP) 25, the second digital signal processor (DSP) 26, and various types of electronic circuits 27 to 29 are arranged in a space other than the portion where the microphones MC1 to MC6 are located. In the present embodiment, the DSP 25 is used as the signal processing means for performing processing such as filter processing and microphone selection processing together with the various types of electronic circuits 27 to 29, and the DSP 26 is used as an echo canceller.

Figure 5:
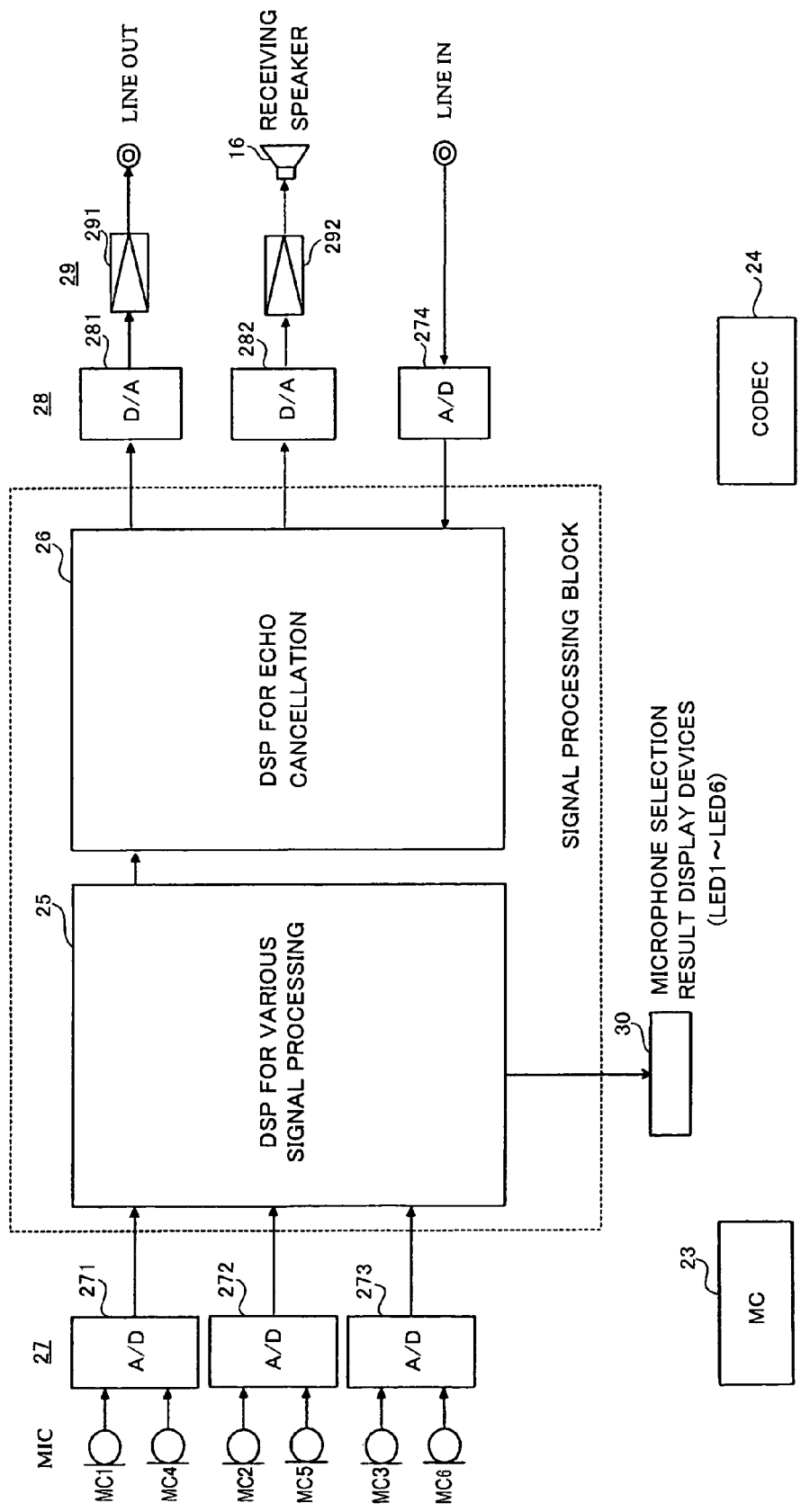
FIG. 5 is a view of a connection configuration of principal circuits of the microphone electronic circuit housing and shows the connection configuration of a first digital signal processor and a second digital signal processor.

FIG. 5 is a view of the schematic configuration of the microprocessor 23, the codec 24, the DSP 25, the DSP 26, the A/D converter block 27, the D/A converter block 28, the amplifier block 29, and other various types of electronic circuits. The microprocessor 23 performs the processing for overall control of the microphone electronic circuit housing 2. The codec 24 compresses and encodes the audio to be transmitted to the conference room of the other party. The DSP 25 performs the various types of signal processing explained below, for example, the filter processing and the microphone selection processing. The DSP 26 functions as the echo canceller and has an echo cancellation transmitter 261 and an echo cancellation receiver 262. In FIG. 5, as an example of the A/D converter block 27, four A/D converters 271 to 274 are exemplified, as an example of the D/A converter block 28, two D/A converters 281 and 282 are exemplified, and as an example of the amplifier block 29, two amplifiers 291 and 292 are exemplified. In addition, as the microphone electronic circuit housing 2, various types of circuits such as the power supply circuit are mounted on the printed circuit board 21.

In FIG. 4, pairs of microphones MC1-MC4, MC2-MC5, and MC3-MC6 each arranged on a straight line at positions symmetric (or opposite) with respect to the center axis C of the printed circuit board 21 input two channels of analog signals to the A/D converters 271 to 273 for converting analog signals to digital signals. In the present embodiment, one A/D converter converts two channels of analog input signals to digital signals. Therefore, detection signals of two (a pair of) microphones located on a straight line straddling the center axis C, for example, the microphones MC1 and MC4, are input to one A/D converter and converted to the digital signals. Further, in the present embodiment, in order to identify the speaking party of the audio transmitted to the conference room of the other party, the difference of audio of two microphones located on one straight line, the magnitude of the audio, etc. are referred to. Therefore when signals of two microphones located on a straight line are input to the same A/D converter, the conversion timings become almost the same. There are therefore the advantages that the timing error is small when finding the difference of audio outputs of the two microphones, the signal processing becomes easy, etc. Note that the A/D converters 271 to 274 can be configured as A/D converters 271 to 274 equipped with variable gain type amplification functions as well. Sound pickup signals of the microphones MC1 to MC6 converted at the A/D converters 271 to 273 are input to the DSP 25 where various types of signal processing explained later are carried out. As one of processing results of the DSP 25, the result of selection of one of the microphones MC1 to MC6 is output to corresponding light emission diode among the diodes LED1 to LED6—examples of the microphone selection result displaying means 30.

The processing result of the DSP 25 is output to the DSP 26 where the echo cancellation processing is carried out. The DSP 26 has for example an echo cancellation transmitter 261 and an echo cancellation receiver 262. The processing results of the DSP 26 are converted to analog signals at the D/A converters 281 and 282. The output from the D/A converter 281 is encoded at the codec 24 according to need, output to a line-out terminal of the telephone line 920 (FIG. 1A) via the amplifier 291, and output as sound via the receiving and reproduction speaker 16 of the communication apparatus 1 disposed in the conference room of the other party. The audio from the communication apparatus 1 disposed in the conference room of the other party is input via the line-in terminal of the telephone line 920 (FIG. 1A), converted to a digital signal at the A/D converter 274, and input to the DSP 26 where it is used for the echo cancellation processing. Further, the audio from the communication apparatus 1 disposed in the conference room of the other party is applied to the speaker 16 by a not illustrated route and output as sound. The output from the D/A converter 282 is output as sound from the receiving and reproduction speaker 16 of the communication apparatus 1 via the amplifier 292. Namely, the conference participants A1 to A6 can also hear audio emitted by the speaking parties in the conference room via the receiving and reproduction speaker 16 in addition to the audio of the selected speaking party of the conference room of the other party from the receiving and reproduction speaker 16 explained above.

Microphones MC1 to MC6

Figure 6:
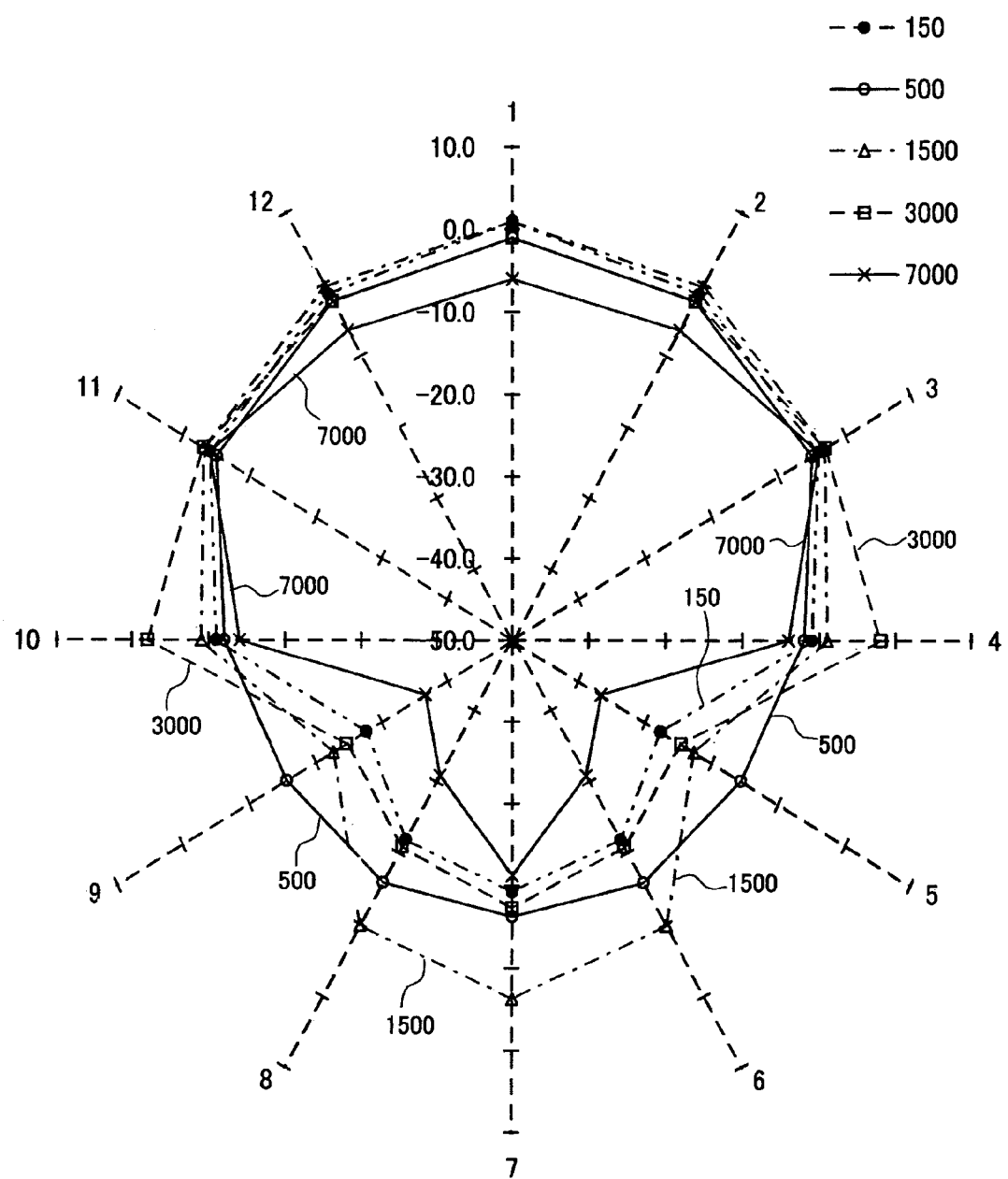
FIG. 6 is a view of the characteristics of the microphones illustrated in FIG. 4.

FIG. 6 is a graph showing the directivity characteristics of the microphones MC1 to MC6. In each single directivity characteristic microphone, as illustrated in FIG. 6, the frequency characteristic and the level characteristic vary according to the angle of arrival of the audio at the microphone from the speaking party. The plurality of curves indicate directivities when frequencies of the sound pickup signals are 100 Hz, 150 Hz, 200 Hz, 300 Hz, 400 Hz, 500 Hz, 700 Hz, 1000 Hz, 1500 Hz, 2000 Hz, 3000 Hz, 4000 Hz, 5000 Hz, and 7000 Hz. Note that for simplifying the illustration, FIG. 6 illustrates the directivity for 150 Hz, 500 Hz, 1500 Hz, 3000 Hz, and 7000 Hz as representative examples.

FIGS. 7A to 7D are graphs showing spectrum analysis results for the position of the sound source and the sound pickup levels of the microphones and, as an example of the analysis, show results obtained by positioning the speaker a predetermined distance from the communication apparatus 1, for example, a distance of 1.5 meters, and applying fast fourier transforms (FFT) to the audio picked up by the microphones at constant time intervals. The X-axis represents the frequency, the Y-axis represents the signal level, and the Z-axis represents the time. When using microphones having directivity of FIG. 6, a strong directivity is shown at the front surfaces of the microphones. In the present embodiment, by making good use of such a characteristic, the DSP 25 performs the selection processing of the microphones.

When not having microphones having directivity as in the present invention, but using microphones having no directivity, all sounds around the microphones are picked up, therefore the S/N's of the audio of the speaking party with the surrounding noise are mixed, so a good sound can not be picked up so much. In order to avoid this, in the present invention, by picking up the sounds by one directivity microphones, the S/N with the surrounding noise is enhanced. As the method for obtaining the directivity of the microphones, a microphone array using a plurality of no directivity microphones can be used. With this method, however, complex processing is required for matching the time axes (phases) of the plurality of signals, therefore a long time is taken, the response is low, and the hardware configuration becomes complex. Namely, complex signal processing is required also for the signal processing system of the DSP. The present invention solves such a problem by using microphones having directivity exemplified in FIG. 6. To combine microphone array signals to utilize microphones as directivity sound pickup microphones, it suffers from the disadvantage that the outer shape is restricted by the pass frequency characteristic and the outer shape becomes large. The present invention also overcomes this disadvantage.

Effect of Hardware Configuration of Communication Apparatus

The communication apparatus having the above configuration has the following advantages.

(1) The positional relationships between the even number of microphones MC1 to MC6 arranged at equal angles radially and at equal intervals and the receiving and reproduction speaker 16 are constant and further the distances thereof are very close, therefore the level of the sound issued from the receiving and reproduction speaker 16 directly coming back is overwhelmingly larger and dominant than the level of the sound issued from the receiving and reproduction speaker 16 passing through the conference room environment and coming back to the microphones MC1 to MC6. Due to this, the characteristics (signal levels (intensities), frequency characteristics (f characteristics), and phases) of arrival of the sounds from the speaker 16 to the microphones MC1 to MC6 are always the same. That is, the communication apparatus 1 in the embodiment of the present invention has the advantage that the transmission function is always the same.

(2) Therefore, there is the advantage that the transmission function when switching the output of the microphone transmitted to the conference room of the other party when the speaking party changes does not change and it is not necessary to adjust the gain of the microphone system whenever the microphone is switched. In other words, there is the advantage that it is not necessary to re-do the adjustment once adjustment is carried out at the time of manufacture of the communication apparatus.

(3) Even if switching the microphone when the speaking party changes for the same reason as above, the provision of a single echo canceller (DSP) 26 is sufficient. A DSP is expensive. Further, it is not necessary to arrange a plurality of DSPs on a printed circuit board 21 on which various members are mounted and having little empty space. Also, the space for arranging the DSP on the printed circuit board 21 may be small. As a result, the printed circuit board 21 and, in turn, the communication apparatus of the present invention can be made small in size.

(4) As explained above, since the transmission functions between the receiving and reproduction speaker 16 and the microphones MC1 to MC6 are constant, there is the advantage for example that adjustment of the sensitivity difference of the microphones of ±3 dB can be carried out solely by the microphone unit of the communication apparatus. Details of the adjustment of the sensitivity difference will be explained later.

(5) As the table on which the communication apparatus 1 is mounted, usually use is made of a round table or a polygonal table. A speaker system for equally dispersing (scattering) audio having an equal quality in the entire orientation of 360 degrees about the axis C by one receiving and reproduction speaker 16 in the communication apparatus 1 becomes possible.

(6) There is the advantage that the sound output from the receiving and reproduction speaker 16 is propagated through the table surface of the round table by the boundary effect and good quality sound effectively arrives at the conference participants equally and with a good efficiency, the sound and the phase of opposite side are cancelled in a ceiling direction of the conference room and become small, there is a little reflected sound from the ceiling direction at the conference participants, and as a result a clear sound is distributed to the participants.

(7) The sound output from the receiving and reproduction speaker 16 arrives at the microphones MC1 to MC6 arranged at equal angles radially and at equal intervals with the same volume simultaneously, therefore a decision of whether sound is audio of a speaking party or received audio becomes easy. As a result, erroneous decision in the microphone selection processing is reduced. Details thereof will be explained later.

(8) By arranging an even number of, for example, six, microphones at equal angles radially and at equal intervals so that a facing pair of microphones are arranged on a straight line, the level comparison for detecting the sound source, for example, the direction of the speaking party, can be easily carried out.

(9) By the dampers 18, the microphone support members 22 etc., the influence of vibration due to the sound of the receiving and reproduction speaker 16 exerted upon the sound pickup of the microphones MC1 to MC6 can be reduced.

(10) As illustrated in FIG. 3, structurally, the degree of direct propagation of the sound of the receiving and reproduction speaker 16 to the microphones MC1 to MC6 is small. Accordingly, in the communication apparatus 1, there is little influence of the noise from the receiving and reproduction speaker 16.

Modification

Figure 8:
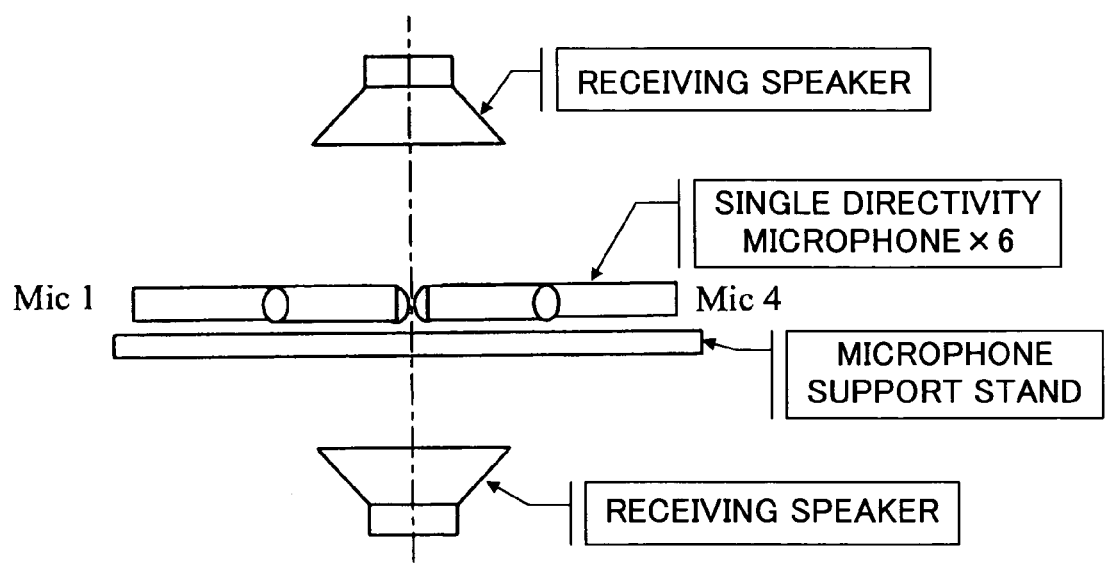
FIG. 8 is a view of the partial configuration of a modification of the communication apparatus of the present invention.

In the communication apparatus 1 explained referring to FIG. 2 to FIG. 3, the receiving and reproduction speaker 16 was arranged at the lower portion, and the microphones MC1 to MC6 (and related electronic circuits) were arranged at the upper portion, but it is also possible to vertically invert the positions of the receiving and reproduction speaker 16 and the microphones MC1 to MC6 (and related electronic circuits) as illustrated in FIG. 8. Even in-such a case, the above effects are exhibited.

The number of microphones is not limited to six. Any number of microphones, for example, four or eight, may be arranged at equal angles radially and at equal intervals about the axis C so that a plurality of pairs are located on straight lines (in the same direction), for example, like the microphones MC1 and MC4. The reason that two microphones, for example MC1 and MC4, are arranged on a straight line facing each other is for easily and correctly identifying the speaking party.

Content of Signal Processing

Below, the content of the processing performed mainly by the first digital signal processor (DSP) 25 will be explained.

FIG. 9 is a view schematically illustrating the processing performed by the DSP 25. Below, a brief explanation will be given.

(1) Measurement of Surrounding Noise

As an initial operation, preferably, the noise of the surroundings where the two-way communication apparatus 1 is disposed is measured. The communication apparatus 1 can be used in various environments (conference rooms). In order to achieve correct selection of the microphone and raise the performance of the communication apparatus 1, in the present invention, at the initial stage, the noise of the surrounding environment where the communication apparatus 1 is disposed is measured to enable elimination of the influence of that noise from the signals picked up at the microphones. Naturally, when the communication apparatus 1 is repeatedly used in the same conference room, the noise is measured in advance, so this processing can be omitted when the state of the noise does not change. Note that the noise can also be measured in the normal state. Details of the noise measurement will be explained later.

(2) Selection of Chairman

For example, when using the communication apparatus 1 for a two-way conference, it is advantageous if there is a chairman who runs the proceedings in the conference rooms. Accordingly, as an aspect of the present invention, in the initial stage using the communication apparatus 1, the chairman is set from the operation unit 15 of the communication apparatus 1. As a method for setting the chairman, for example the first microphone MC1 located in the vicinity of the operation unit 15 is used as the chairman's microphone. Naturally, the chairman's microphone may be any microphone. Note that when the chairman repeatedly using the communication apparatus 1 is the same, this processing can be omitted. Alternatively, the microphone at the position where the chairman sits may be determined in advance too. In this case, no operation for selection of the chairman is necessary each time. Naturally, the selection of the chairman is not limited to the initial state and can be carried out at any time. Details of the selection of the chairman will be explained later.

(3) Adjustment of Sensitivity Difference of Microphones

As the initial operation, preferably the gain of the amplification unit for amplifying signals of the microphones MC1 to MC6 or the attenuation value of the attenuation unit is automatically adjusted so that the acoustic couplings between the receiving and reproduction speaker 16 and the microphones MC1 to MC6 become equal. The adjustment of the sensitivity difference will be explained later.

As the usual processing, various types of processings exemplified below are carried out.

(1) Processing for Selection and Switching of Microphones

When a plurality of conference participants simultaneously speak in one conference room, the audio is mixed and hard to understand by the conference participants A1 to A6 in the conference room of the other party. Therefore, in the present invention, in principle, only one person is allowed to speak in a certain time interval. For this, the DSP 25 performs processing for identifying the speaking party and then selecting and switching the microphone for which speech is permitted. As a result, only the speech from the selected microphone is transmitted to the communication apparatus 1 of the conference room of the other party via the telephone line 920 and output from the speaker. Naturally, as explained by referring to FIG. 5, the LED in the vicinity of the microphone of the selected speaking party turns on. The audio of the selected speaking party can be heard from the speaker of the communication apparatus 1 of that room as well so that it can be recognized who is the permitted speaking party. Due to this processing, the signal of the single directivity microphone facing to the speaking party is selected, so a signal having a good S/N can be sent to the other party as the transmission signal.

(2) Display of Selected Microphone

Whether a microphone of the speaking party is selected and which is the microphone of the conference participant permitted to speak is made easy to recognize by all of the conference participants A1 to A6 by turning on the corresponding microphone selection result displaying means 30, for example, light emission diodes LED1 to LED6.

(3) Signal Processing

As a background art of the above microphone selection processing or in order to correctly execute the processing for the microphone selection, various types of signal processing exemplified below are carried out.

(a) Processing for band separation and level conversion of sound pickup signals of microphones (b) Processing for judgment of start and end of speech For use as a trigger for start of judgment for selection of the signal of the microphone facing the direction of the speaking party (c) Processing for detection of the microphone in the direction of the speaking party For analyzing the sound pickup signals of microphones and judging the microphone used by the speaking party (d) Processing for judgment of timing of switching of the microphone in the direction of the speaking party and processing for switching the selection of the signal of the microphone facing the detected speaking party For instructing switching to the microphone selected from the above processing results (e) Measurement of floor noise at the time of normal operation Measurement of Floor (Environment) Noise This processing is divided into initial processing immediately after turning on the power of the two-way communication apparatus and the normal processing. Note that the processing is carried out under the following typical preconditions.

(1) Condition: Measurement time and threshold provisional value:

1. Test tone sound pressure: −40 dB in terms of microphone signal level

2. Noise measurement unit time: 10 seconds

3. Noise measurement in normal state: Calculation of mean value by measurement results of 10 seconds further repeated 10 times to find the mean value deemed as the noise level.

(2) Standard and threshold value of valid distance by difference between floor noise and speech start reference level 1. 26 dB or more: 3 meters or more
Detection level threshold value of start of speech: Floor noise level +9 dB
Detection level threshold value of end of speech: Floor noise level +6 dB 2. 20 to 26 dB: Not more than 3 meters
Detection level threshold value of start of speech: Floor noise level +9 dB
Detection level threshold value of end of speech: Floor noise level +6 dB 3. 14 to 20 dB: Not more than 1.5 meters
Detection level threshold value of start of speech: Floor noise level +9 dB
Detection level threshold value of end of speech: Floor noise level +6 dB 4. 9 to 14 dB: Not more than 1 meter
Difference between floor noise level and speech start reference level ÷2+2 dB
Detection level threshold value of end of speech: speech start threshold value −3 dB 5. 9 dB or less: Slightly hard, several tens centimeters
Detection level threshold value of start of speech:

6. Difference between floor noise level and speech start reference level ÷2
Detection level threshold value of end of speech: −3 dB 7. Same or minus: Cannot be judged, selection prohibited (3) The noise measurement start threshold value of the normal processing is started from when the level of the floor noise +3 dB when turning on the power supply is obtained.

Generation of Various Types of Frequency Component Signals by Filter Processing

Figure 10:
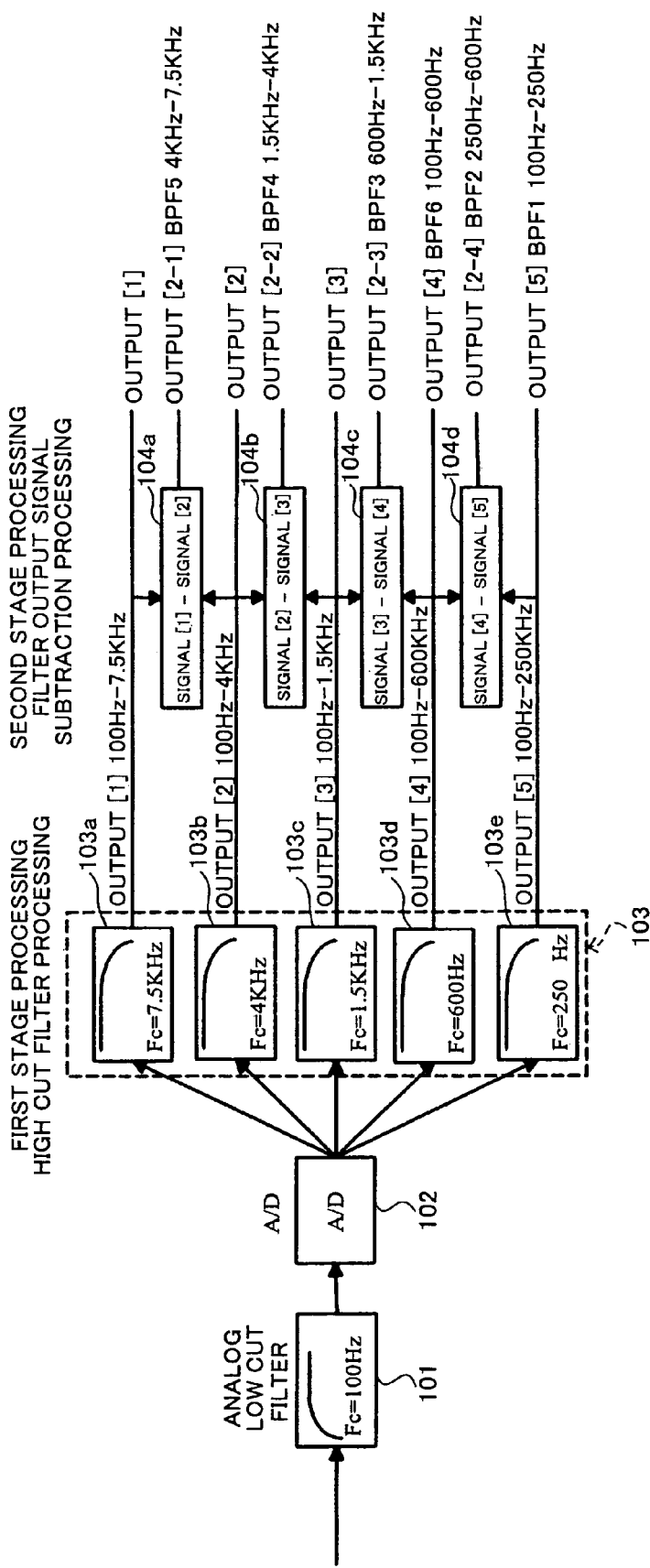
FIG. 10 is a view of filter processing in the communication apparatus of the present invention.

FIG. 10 is a view of the configuration showing the filter processing performed at the DSP 25 using the sound signals picked up by the microphones as pre-processing. FIG. 10 shows the processing for one microphone (channel (one sound pickup signal)).

The sound pickup signals of microphones are processed at an analog low cut filter 101 having a cut-off frequency of for example 100 Hz, the filtered voice signals from which the frequency of 100 Hz or less was removed are output to the A/D converter 102, and the sound pickup signals converted to the digital signals at the A/D converter 102 are stripped of their high frequency components at the digital high cut filters 103a to 103e (referred to overall as 103) having cut-off frequencies of 7.5 kHz, 4 kHz, 1.5 kHz, 600 Hz, and 250 Hz (high cut processing). The results of the digital high cut filters 103a to 103e are further subtracted by the filter signals of the adjacent digital high cut filters 103a to 103e in the subtractors 104a to 104d (referred to overall as 104). In this embodiment of the present invention, the digital high cut filters 103a to 103e and the subtractors 104a to 104e are actually realized by processing in the DSP 25. The A/D converter 102 can be realized as part of the A/D converter block 27.

Figure 11:
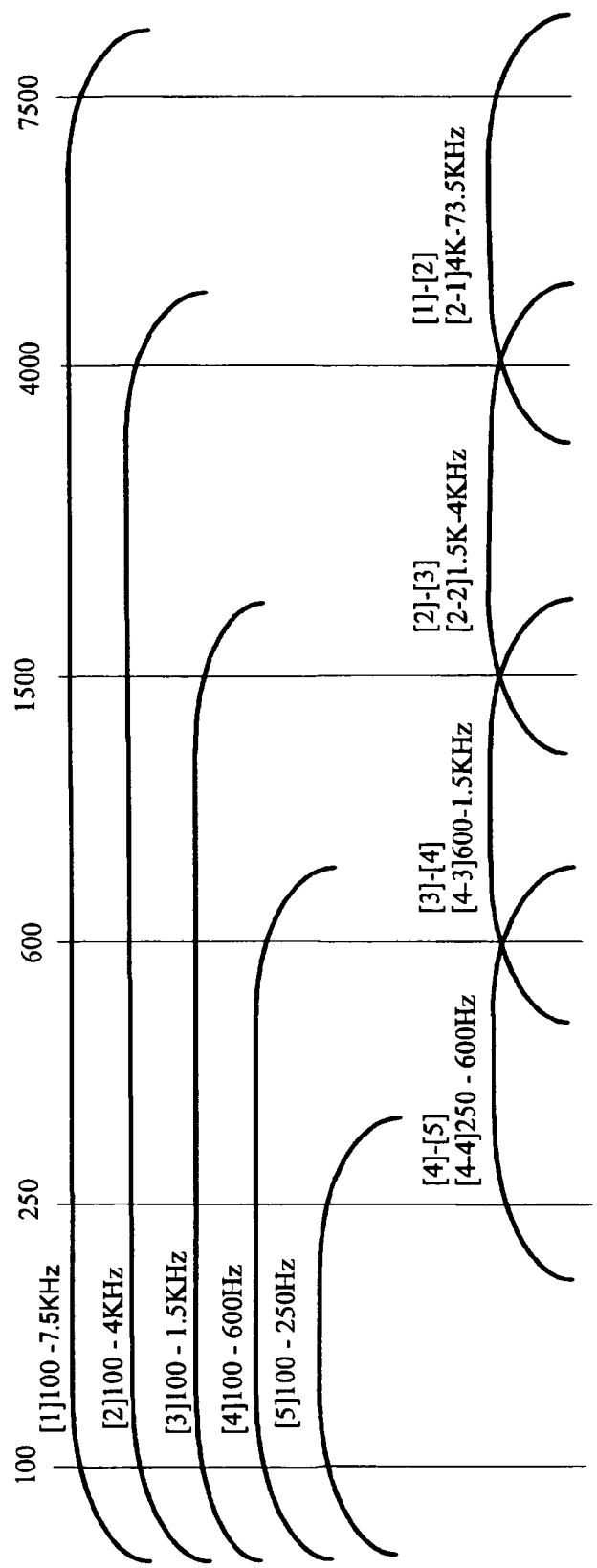
FIG. 11 is a view of a frequency characteristic of processing results of FIG. 10.

FIG. 11 is a view of the frequency characteristic showing the filter processing result explained by referring to FIG. 10. In this way, a plurality of signals having various types of frequency components are generated from signals picked up by microphones having single directivity.

Band-Pass Filter Processing and Microphone Signal Level Conversion Processing

Figure 12:
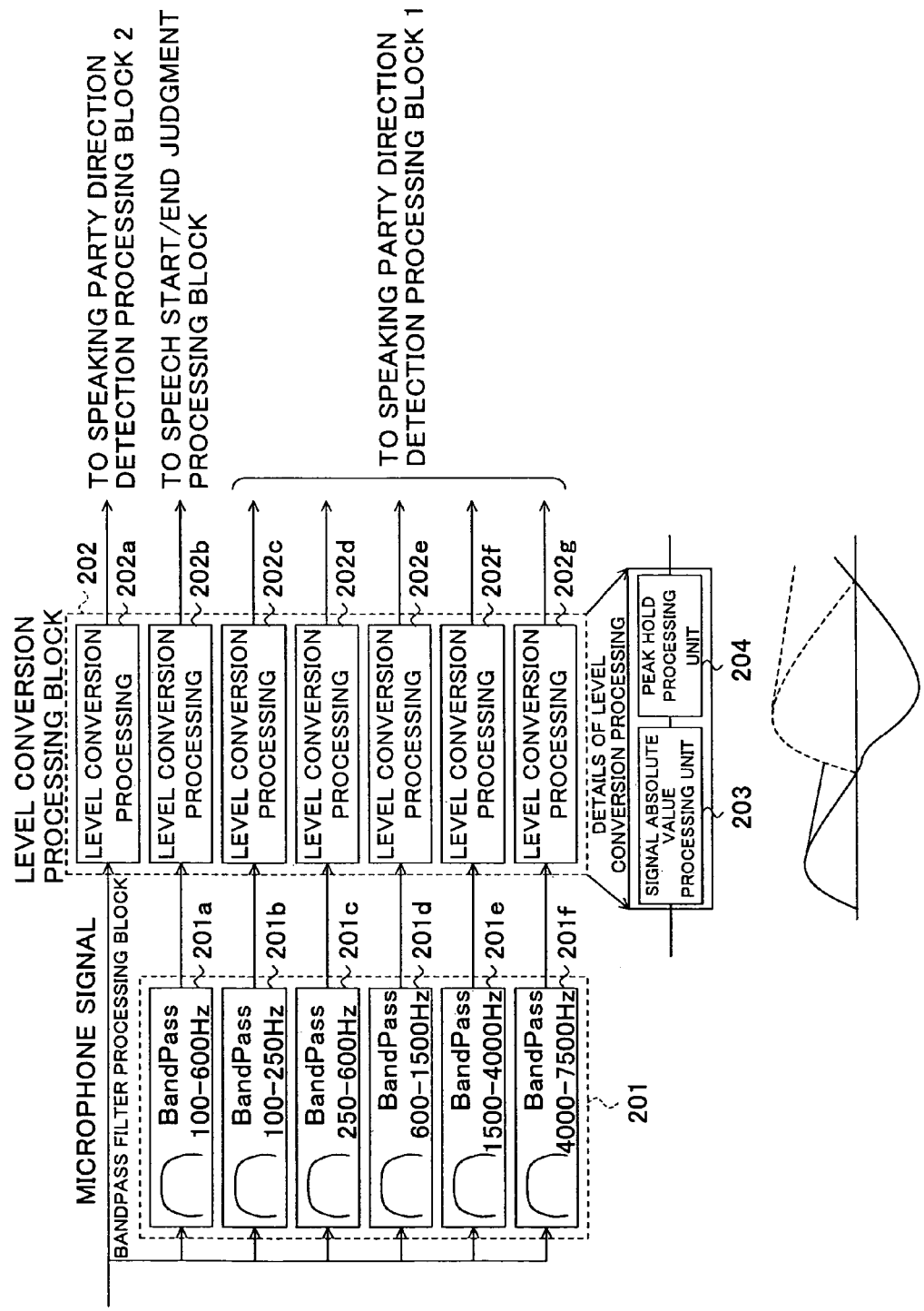
FIG. 12 is a block diagram of band pass filter processing and level conversion processing of the present invention.

As one of the triggers for start of the microphone selection processing, the start and end of the speech is judged. The signal used for this is obtained by the bandpass filter processing and the level conversion processing illustrated in FIG. 12 performed at the DSP 25. FIG. 12 shows only one channel (CH) of the processing of six channels of input signals picked up at the microphones MC1 to MC6. The bandpass filter processing and level conversion processing unit in the DSP 25 have, for the channels of the sound pickup signals of the microphones, bandpass filters 201a to 201e (referred to overall as the "bandpass filter block 201") having bandpass characteristics of 100 to 600 Hz, 200 to 250 Hz, 250 to 600 Hz, 600 to 1500 Hz, 1500 to 4000 Hz, and 4000 to 7500 Hz and level converters 202a to 202g (referred to overall as the "level converter block 202") for converting the levels of the original microphone sound pickup signals and the band-passed sound pickup signals.

Each of the level conversion units 202a to 202g has a signal absolute value processing unit 203 and a peak hold processing unit 204. Accordingly, as illustrated by the waveform, the signal absolute value processing unit 203 inverts the sign when receiving as input a negative signal indicated by a broken line to converts the same to a positive signal. The peak hold processing unit 204 holds the maximum value of the output signals of the signal absolute value processing unit 203. Note that in the present embodiment, the held maximum value drops a little along with the elapse of time. Naturally, it is also possible to improve the peak hold processing unit 204 to reduce the amount of drop and enable the maximum value to be held for a long time.

The bandpass filter will be explained next. The bandpass filter used in the communication apparatus 1 is for example comprised of just a second-order IIR high-cut filter and a low-cut filter of the microphone signal input stage. The present embodiment utilizes the fact that if a signal passed through the high cut filter is subtracted from a signal having a flat frequency characteristic, the remainder becomes substantially equivalent to a signal passed through the low cut filter. In order to match the frequency-level characteristics, one extra band of the bandpass filters of the full bandpass becomes necessary. The required bandpass is obtained by the number of bands and filter coefficients of the number of bands of the bandpass filters +1. The band frequency of the bandpass filter required this time is the following six bands of bandpass filters per channel (CH) of the microphone signal:

| BP characteristic | Bandpass filter |
|---|---|
| BPF1 = [100 Hz–250 Hz] | 201b |
| BPF2 = [250 Hz–600 Hz] | 201c |
| BPF3 = [600 Hz–1.5 kHz] | 201d |
| BPF4 = [1.5 kHz–4 kHz] | 201e |
| BPF5 = [4 kHz–7.5 kHz] | 201f |
| BPF6 = [100 Hz–600 Hz] | 201a |

In this method, the computation program of the IIR filters in the DSP 25 is only 6 CH (channel)×5 (IIR filter)=30. Compare this with the configuration of conventional bandpass filters. If configuring the bandpass filters using second-order IIR filters and preparing six bands of bandpass filters for six microphone signals as in the present invention, in the conventional method, the IIR filter processing of 6×6×2=72 circuits becomes necessary. This processing needs considerable program processing even by the newest excellent DSP and exerts an influence upon the other processing. In this embodiment of the present invention, 100 Hz low-cut filter processing is realized by the analog filters of the input stage. There are five cut-off frequencies of the prepared secondary IIR high cut filters: 250 Hz, 600 Hz, 1.5 kHz, 4 kHz, and 7.5 kHz. The high cut filter having the cut-off frequency of 7.5 kHz among them actually has a sampling frequency of 16 kHz, so is unnecessary, but the phase of the subtracted number is intentionally rotated in order to reduce the phenomenon of the output level of the bandpass filter being reduced due to phase rotation of the IIR filter in the step of the subtraction processing.

Figure 13:
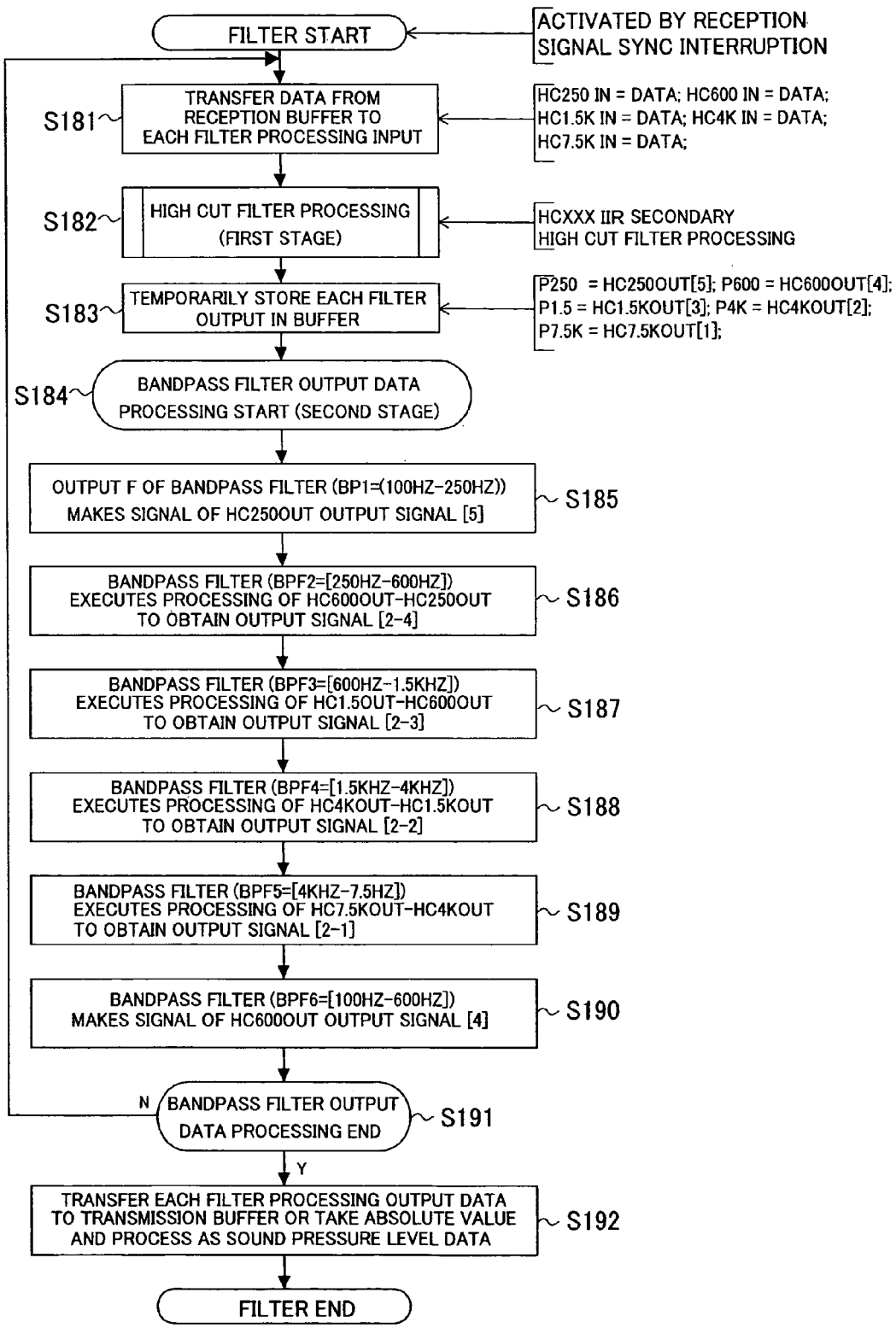
FIG. 13 is a flow chart of the processing of FIG. 12.

FIG. 13 is a flow chart of the processing by the configuration illustrated in FIG. 12 at the DSP 25.

Figure 14:
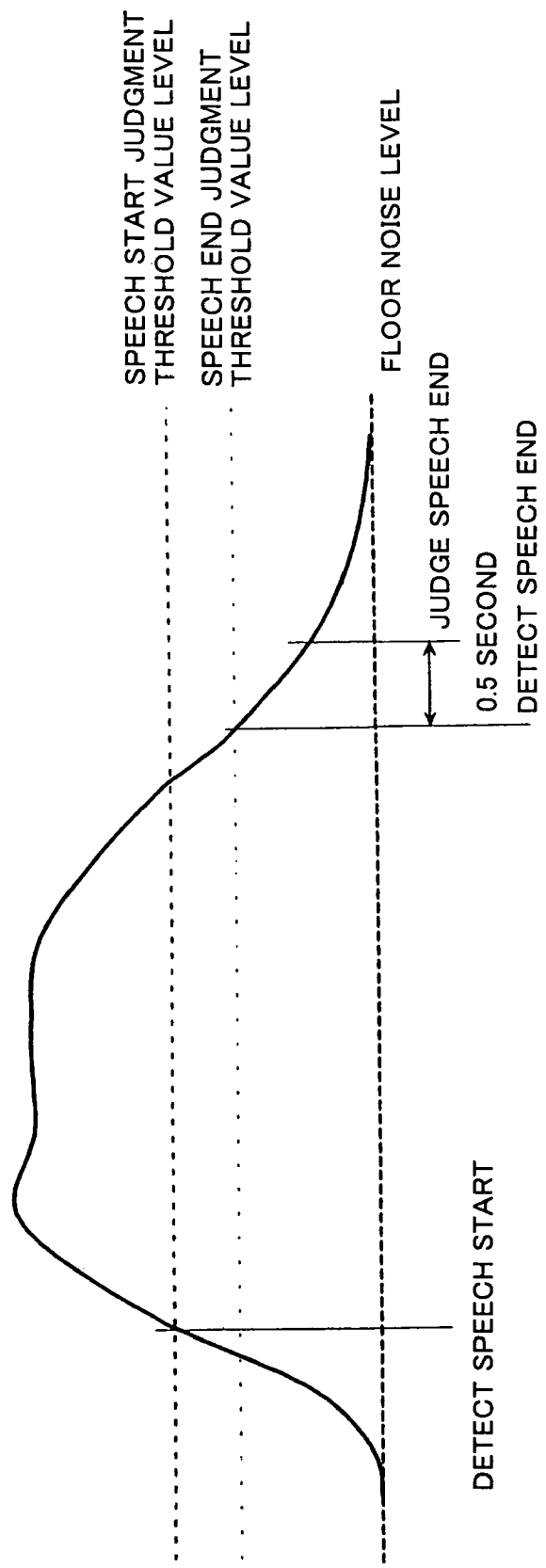
FIG. 14 is a graph showing processing for judging a start and an end of speech in the communication apparatus of the present invention.

In the filter processing at the DSP 25 illustrated in FIG. 13, the high-pass filter processing is carried out as the first stage of processing, while the subtraction processing from the result of the first stage of the high pass filter processing is carried out as the second stage of processing. FIG. 14 is a view of the rough frequency characteristics of the results of the signal processing. In the following explanation, [1] to [5] show the processing case in FIG. 11.

First Stage

[1] For the full bandpass filter, the input signal is passed through the 7.5 kHz high-cut filter. This filter output signal becomes the bandpass filter output of [100 Hz–7.5 kHz] by combination with the analog low cut filter.

[2] The input signal is passed through the 4 kHz high-cut filter. This filter output signal becomes the bandpass filter output of [100 Hz–4 kHz] by combination with the input analog low-cut filter.

[3] The input signal is passed through the 1.5 kHz high-cut filter. This filter output signal becomes the bandpass filter output of [100 Hz–1.5 kHz] by combination with the input analog low-cut filter.

[4] The input signal is passed through the 600 kHz high cut filter. This filter output signal becomes the bandpass filter output of [100 Hz–600 kHz] by combination with the input analog low-cut filter.

[5] The input signal is passed through the 250 kHz high cut filter. This filter output signal becomes the bandpass filter output of [100 Hz–250 kHz] by combination with the input analog low-cut filter.

Second Stage

[1] When the bandpass filter (BPF5=[4 kHz to 7.5 kHz]) executes the processing of the filter output [1]–[2] ([100 Hz to 7.5 kHz]–[100 Hz to 4 kHz]), the above signal output [4 kHz to 7.5 kHz] is obtained.

[2] When the bandpass filter (BPF4=[1.5 kHz to 4 kHz]) executes the processing of the filter output [2]–[3] ([100 Hz to 4 kHz]–[100 Hz to 1.5 kHz]), the above signal output [1.5 kHz to 4 kHz] is obtained.

[3] When the bandpass filter (BPF3=[60 kHz to 1.5 kHz]) executes the processing of the filter output [3]–[4] ([100 Hz to 1.5 kHz]–[100 Hz to 600 Hz]), the above signal output [600 Hz to 1.5 kHz] is obtained.

[4] When the bandpass filter (BPF2=[250 Hz to 600 Hz]) executes the processing of the filter output [4]–[5] ([100 Hz to 600 Hz]–[100 Hz to 250 Hz]), the above signal output [250 Hz to 600 Hz] is obtained.

[5] The bandpass filter (BPF1=[100 Hz to 250 Hz]) defines the signal of the above [5] as is as the output signal of the above [5].

[6] The bandpass filter (BPF6=[100 Hz to 600 Hz]) defines the signal of the above [4] as is as the output signal of the above [4].

The required bandpass filter output is obtained by the above processing in the DSP 25.

The input sound pickup signals MIC1 to MIC6 of the microphones are constantly updated as in Table 1 as the sound pressure level of the entire band and the six bands of sound pressure levels passed through the bandpass filter.

TABLE 1

Results of Conversion of Signal Levels

| | BPF1 | BPF2 | BPF3 | BPF4 | BPF5 | BPF6 | ALL |
|---|---|---|---|---|---|---|---|
| MIC1 | L1-1 | L1-2 | L1-3 | L1-4 | L1-5 | L1-6 | L1-A |
| MIC2 | L2-1 | L2-2 | L2-3 | L2-4 | L2-5 | L2-6 | L2-A |
| MIC3 | L3-1 | L3-2 | L3-3 | L3-4 | L3-5 | L3-6 | L3-A |
| MIC4 | L4-1 | L4-2 | L4-3 | L4-4 | L4-5 | L4-6 | L4-A |
| MIC5 | L5-1 | L5-2 | L5-3 | L5-4 | L5-5 | L5-6 | L5-A |
| MIC6 | L6-1 | L6-2 | L6-3 | L6-4 | L6-5 | L6-6 | L6-A |

In Table 1, for example, L1-1 indicates the peak level when the sound pickup signal of the microphone MC1 passes through the first bandpass filter 201a. In the judgment of the start and end of speech, use is made of the microphone sound pickup signal passed through the 100 Hz to 600 Hz bandpass filter 201a illustrated in FIG. 12 and converted in sound pressure level at the level conversion unit 202b.

A conventional bandpass filter is configured by combining a high-pass filter and low-pass filter for each stage of the bandpass filter. Therefore filter processing of 72 circuits would become necessary if constructing 36 circuits of bandpass filters based on the specification used in the present embodiment. As opposed to this, the filter configuration of the embodiment of the present invention becomes simple as explained above.

Processing for Judgment of Start and End of Speech

Based on the value output from the sound pressure level detection unit, as illustrated in FIG. 14, the first digital signal processor (DSP1) 25 judges the start of speech when the microphone sound pickup signal level rises over the floor noise and exceeds the threshold value of the speech start level, judges speech is in progress when a level higher than the threshold value of the start level continues after that, judges there is floor noise when the level falls below the threshold value of the end of speech, and judges the end of speech when the level continues for the speech end judgment time, for example, 0.5 second.

The start and end judgment of speech judges the start of speech from the time when the sound pressure level data (microphone signal level (1)) passing through the 100 Hz to 600 Hz bandpass filter and converted in sound pressure level at the microphone signal conversion processing unit 202b illustrated in FIG. 12 becomes higher than the threshold value level illustrated in FIG. 14.

The DSP 25 is designed not to detect the start of the next speech during the speech end judgment time, for example, 0.5 second, after detecting the start of speech in order to avoid the malfunctions accompanying frequent switching of the microphones.

Microphone Selection

Figure 15:
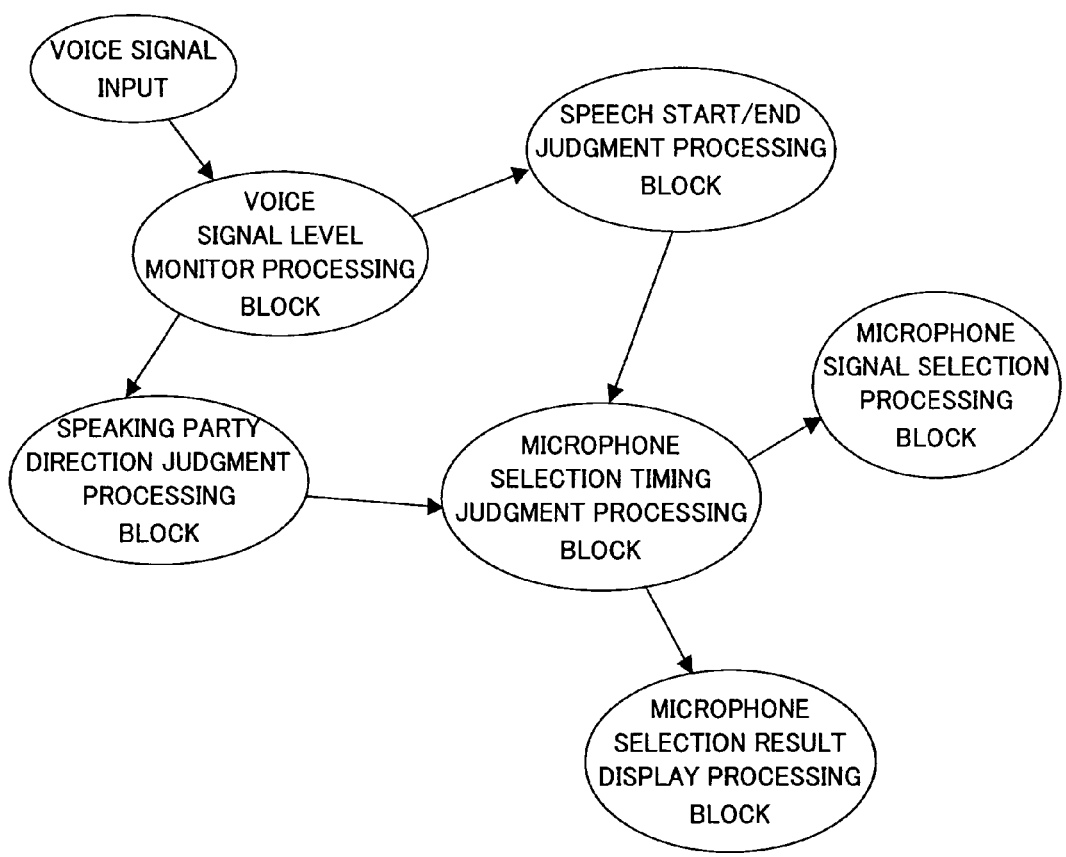
FIG. 15 is a chart of the flow of normal processing in the communication apparatus of the present invention.
Figure 16:
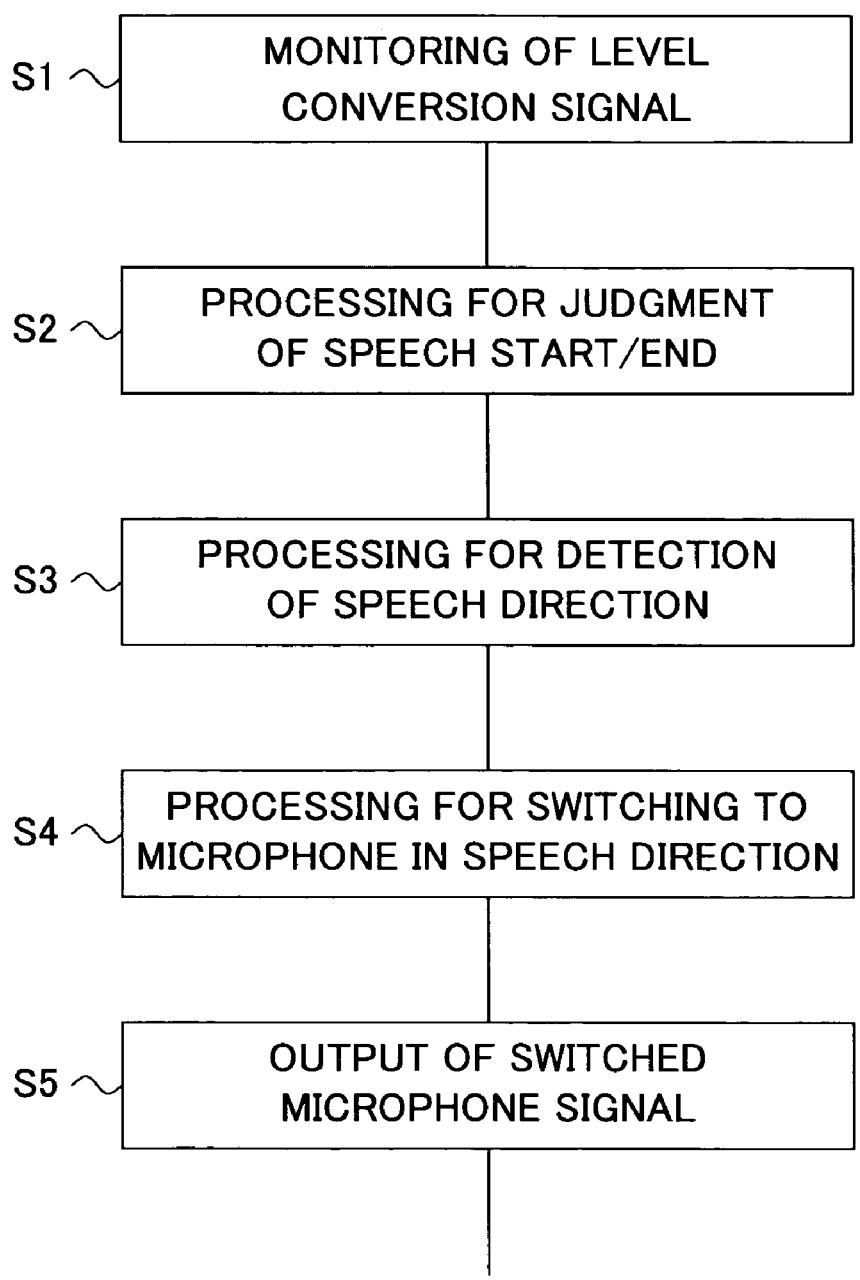
FIG. 16 is a chart of the flow of normal processing in the communication apparatus of the present invention.

The DSP 25 detects the direction of the speaking party in the mutual speech system and automatically selects the signal of the microphone facing to the speaking party based on the so-called "score card method". FIG. 15 is a view illustrating the types of operation of the communication apparatus 1. FIG. 16 is a flow chart showing the normal processing of the communication apparatus 1.

The communication apparatus 1, as illustrated in FIG. 15, performs processing for monitoring the audio signal in accordance with the sound pickup signals from the microphones MC1 to MC6, judges the speech start/end, judges the speech direction, and selects the microphone and displays the results on the microphone selection result displaying means 30, for example, the light emission diodes LED1 to LED6. Below, a description will be given of the operation mainly using the DSP 25 in the communication apparatus 1 by referring to the flow chart of FIG. 16. Note that the overall control of the microphone electronic circuit housing 2 is carried out by the microprocessor 23, but the description will be given focusing on the processing of the DSP 25.

Step 1: Monitoring of Level Conversion Signal

The signals picked up at the microphones MC1 to MC6 are converted as seven types of level data in the bandpass filter block 201 and the level conversion block 202 explained by referring to FIG. 11 to FIG. 13, especially FIG. 12, so the DSP 25 constantly monitors seven types of signals for the microphone sound pickup signals. Based on the monitor results, the DSP 25 shifts to either processing of the speaking party direction detection processing 1, the speaking party direction detection processing 2, or the speech start end judgment processing.

Step 2: Processing for Judgment of Speech Start/End

The DSP 25 judges the start and end of speech by referring to FIG. 13 and further according to the method explained in detail below. When detecting the start of speech, the DSP 25 informs the detection of the speech start to the speaking party direction judgment processing of step 4. Note that, in the processing for judgment of the start and end of speech at step 2, when the speech level becomes smaller than the speech end level, the timer of the speech end judgment time (for example 0.5 second) is activated. When the speech level is smaller than the speech end level during the speech end judgment, it is judged that the speech has ended. When it becomes larger than the speech end level during the speech end judgment, the wait processing is entered until it becomes smaller than the speech end level again.

Step 3: Processing for Detection of Speaking Party Direction

The processing for detection of the speaking party direction in the DSP 25 is carried out by constantly continuously searching for the speaking party direction. Thereafter, the data is supplied to the processing for judgment of the speaking party direction of step 4.

Step 4: Processing for Switching of Speaking Party Direction Microphone

The processing for judgment of timing in the processing for switching the speaking party direction microphone in the DSP 25 instructs the selection of a microphone in a new speaking party direction to the processing for switching the microphone signal of step 4 when the results of the processing of step 2 and the processing of step 3 are that the speaking party detection direction at that time and the speaking party direction which has been selected up to now are different. Note that when the chairman's microphone has been set from the operation unit 15 and the chairman's microphone and other conference participants simultaneously speak, priority is given to the speech of the chairman. At this time, the selected microphone information is displayed on the microphone selection result displaying means 30, for example, the light emission diodes LED1 to LED6.

Step 5: Transmission of Microphone Sound Pickup Signals

The processing for switching the microphone signal transmits only the microphone signal selected by the processing of step 4 from among the six microphone signals as the transmission signal from the communication apparatus 1 to the communication apparatus of the other party via the telephone line 920, so outputs it to the line-out terminal of the telephone line 920 illustrated in FIG. 5.

Set-Up of Speech Start Level Threshold Value and Speech End Threshold Value

Processing 1: A predetermined time's worth, for example, one second's worth, of floor noise, is measured for each microphone immediately after turning on the power. The DSP 25 reads out the peak held level values of the sound pressure level detection unit at constant time intervals, for example intervals of 10 msec in the present embodiment, calculates the mean value for the predetermined time, for example, one minute, and defines it as the floor noise. The DSP 25 determines the threshold value of the detection level of the speech start (floor noise +9 dB) and the threshold value of the detection level of the speech end (floor noise +6 dB) based on the measured floor noise level. The DSP 25 reads out the peak held level values of the sound pressure level detector at constant time intervals even after that. When it judges the end of speech, the DSP 25 acts for measuring the floor noise, detects the start of speech, and updates the threshold value of the detection level of the end of speech.

According to this method, since floor noise levels of the positions where microphones are placed differ from each other, this threshold value setting can set each threshold value for each microphone and can prevent erroneous judgment in the selection of the microphone due to a noise sound source.

Processing 2: For room of surrounding noise (having large floor noise)

When the floor noise is large and the threshold level is automatically updated in the processing 1, the processing 2 performs the following as a countermeasure for when detection of the start or end of speech is hard. The DSP 25 determines the threshold values of the detection level of the start of speech and the detection level of the end of speech based on the predicted floor noise level. The DSP 25 sets the speech start threshold value level larger than the speech end threshold value level (a difference of for example 3 dB or more). The DSP 25 reads out the peak held level values at constant time intervals by the sound pressure level detector.

According to this method, since the threshold value is the same value with respect to all microphones, this threshold value setting enables speech start to be recognized by the magnitudes of the voices of persons with their backs to the noise source and the voices of other persons being the same degree.

Judgment of Speech Start

Processing 1: The output levels of the sound pressure level detector corresponding to the six microphones and the threshold value of the speech start level are compared. The start of speech is judged when the output level exceeds the threshold value of the speech start level. When the output levels of the sound pressure level detector corresponding to all microphones exceed the threshold value of the speech start level, the DSP 25 judges the signal to be from the receiving and reproduction speaker 16 and does not judge that speech has started. This is because the distances between the receiving and reproduction speaker 16 and all microphones MC1 to MC6 are the same, so the sound from the receiving and reproduction speaker 16 reaches all microphones MC1 to MC6 almost equally.

Processing 2: Three sets of microphones each comprised of two single directivity microphones (microphones MC1 and MC4, microphones MC2 and MC5, and microphones MC3 and MC6) obtained by arranging the six microphones illustrated in FIG. 4 at equal angles of 60 degrees radially and at equal intervals and having directivity axes shifted by 180 degrees in opposite directions are prepared, and the level differences of two microphone signals are utilized. Namely, the following operations are executed:

Absolute value of (signal level of microphone 1-signal level of microphone 4) . . . [1]

Absolute value of (signal level of microphone 2-signal level of microphone 5) . . . [2]

Absolute value of (signal level of microphone 3-signal level of microphone 6) . . . [3]

The DSP 25 compares the above absolute values [1], [2], and [3] with the threshold value of the speech start level and judges the speech start when the absolute value exceeds the threshold value of the speech start level. In the case of this processing, all absolute values do not become larger than the threshold value of the speech start level unlike the processing 1 (since sound from the receiving and reproduction speaker 16 equally reaches all microphones), so judgment of whether the sound is from the receiving and reproduction speaker 16 or audio from a speaking party becomes unnecessary.

Processing for Detection of Speaking Party Direction

Figure 7A:
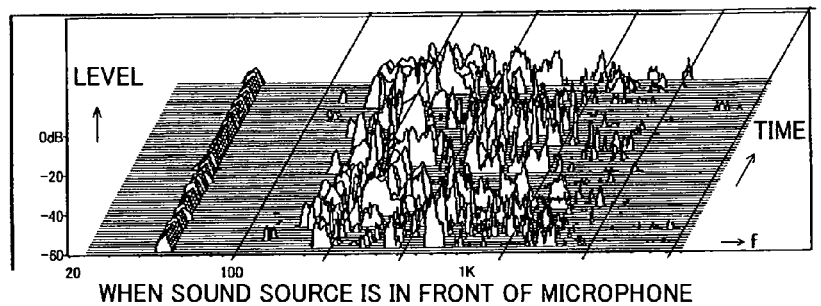
FIGS. 7A to 7D are graphs showing results of analysis of the directivities of microphones having the characteristics illustrated in FIG. 6.
Figure 7B:
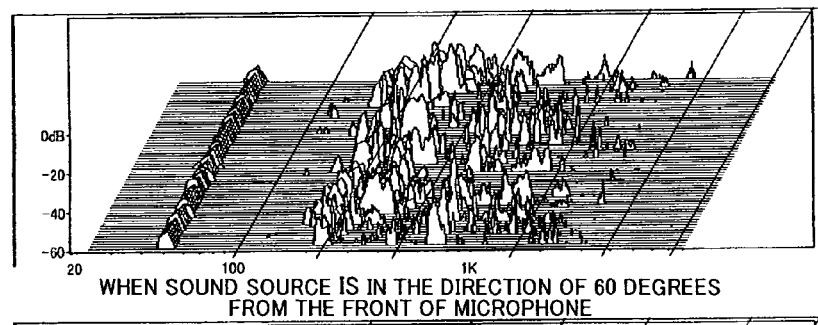
Figure 7C:
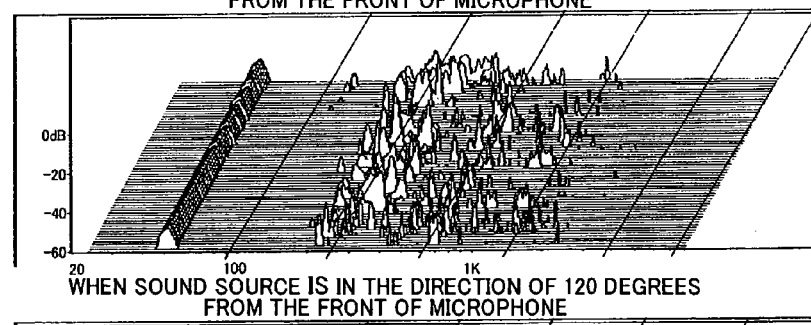
Figure 7D:
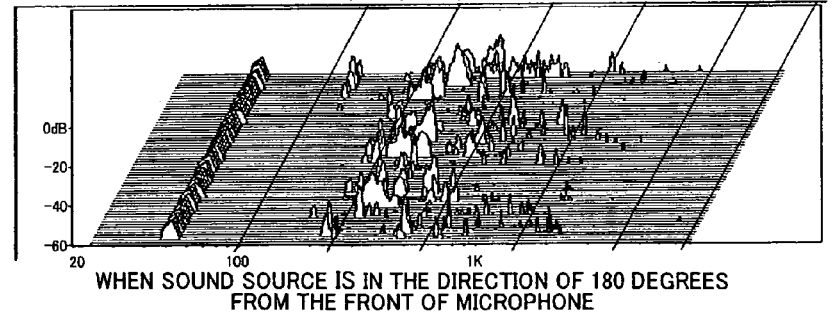

For the detection of the speaking party direction, the characteristics of the single directivity microphones exemplified in FIG. 6 are utilized. In the single directivity characteristic microphones, as exemplified in FIG. 6, the frequency characteristic and level characteristic change according to the angle of the audio from the speaking party reaching the microphones. The results are shown in FIGS. 7A to 7C. FIGS. 7A to 7C show the results of application of a fast fourier transform (FFT) to audio picked up by microphones at constant time intervals by placing the speaker a predetermined distance from the communication apparatus 1, for example, a distance of 1.5 meters. The X-axis represents the frequency, the Y-axis represents the signal level, and the Z-axis represents time. The lateral lines represent the cut-off frequency of the bandpass filter. The level of the frequency band sandwiched by these lines becomes the data from the microphone signal level conversion processing passing through five bands of bandpass filters and converted to the sound pressure level explained by referring to FIG. 10 to FIG. 13.

The method of judgment applied as the actual processing for detecting the speaking party direction in the communication apparatus 1 according to an embodiment of the present invention will be described next. Suitable weighting processing (0 when 0 dBFs in a 1 dB full span (1 dBFs) step, while 3 when −3 dBFs, or vice versa) is carried out with respect to the output level of each band of bandpass filter. The resolution of the processing is determined by this weighting step. The above weighting processing is executed for each sample clock, the weighted scores of each microphone are added, the result is averaged for the constant number of samples, and the microphone signal having a small (large) total points is judged as the microphone facing the speaking party. The following Table 2 indicates the rough results.

TABLE 2

| Case Where Signal Levels Are Represented by Points | | | | | | |
|---|---|---|---|---|---|---|
| | BPF1 | BPF2 | BPF3 | BPF4 | BPF5 | Sum |
| MIC1 | 20 | 20 | 20 | 20 | 20 | 100 |
| MIC2 | 25 | 25 | 25 | 25 | 25 | 125 |
| MIC3 | 30 | 30 | 30 | 30 | 30 | 150 |
| MIC4 | 40 | 40 | 40 | 40 | 40 | 200 |
| MIC5 | 30 | 30 | 30 | 30 | 30 | 150 |
| MIC6 | 25 | 25 | 25 | 25 | 25 | 125 |

In the example illustrated in Table 2, the first microphone MC1 has the smallest total points, so the DSP 25 judges that there is a sound source (there is a speaking party) in the direction of the first microphone MC1. The DSP 25 holds the result in the form of a sound source direction microphone number. As explained above, the DSP 25 weights the output level of the bandpass filter of the frequency band for each microphone, ranks the outputs of the bands of bandpass filters in the sequence from the microphone signal having the smallest (largest) point up, and judges the microphone signal having the first order for three bands or more as from the microphone facing the speaking party. Then, the DSP 25 prepares the score card as in the following Table 3 indicating that there is a sound source (there is a speaking party) in the direction of the first microphone MC1.

TABLE 3

| Case Where Signals Passed Through Bandpass Filters Are Ranked In Level Sequence | | | | | | |
|---|---|---|---|---|---|---|
| | BPF1 | BPF2 | BPF3 | BPF4 | BPF5 | Sum |
| MIC1 | 1 | 1 | 1 | 1 | 1 | 5 |
| MIC2 | 2 | 2 | 2 | 2 | 2 | 10 |
| MIC3 | 3 | 3 | 3 | 3 | 3 | 15 |
| MIC4 | 4 | 4 | 4 | 4 | 4 | 20 |
| MIC5 | 3 | 3 | 3 | 3 | 3 | 15 |
| MIC6 | 2 | 2 | 2 | 2 | 2 | 10 |

In actuality, due to the influence of the reflection of sound and standing wave according to the characteristics of the room, the result of the first microphone MC1 does not always become the top among the outputs of all bandpass filters, but if the first rank in the majority of five bands, it can be judged that there is a sound source (there is a speaking party) in the direction of the first microphone MC1. The DSP 25 holds the result in the form of the sound source direction microphone number.

The DSP 25 totals up the output level data of the bands of the bandpass filters of the microphones in the form shown in the following, judges the microphone signal having a large level as from the microphone facing the speaking party, and holds the result in the form of the sound source direction microphone number.

MIC1 Level=L1-1+L1-2+L1-1+L1-4+L1–5
MIC2 Level=L2-1+L2-2+L2-1+L2-4+L2–5
MIC3 Level=L3-1+L3-2+L3-1+L3-4+L3–5
MIC4 Level=L4-1+L4-2+L4-1+L4-4+L4–5
MIC5 Level=L5-1+L5-2+L5-1+L5-4+L5–5
MIC6 Level=L6-1+L6-2+L6-1+L6-4+L6–5

Processing for Judgment of Switch Timing of Speaking Party Direction Microphone

When activated by the speech start judgment result of step 2 of FIG. 16 and detecting the microphone of a new speaking party from the detection processing result of the speaking party direction of step 3 and the past selection information, the DSP 25 issues a switch command of the microphone signal to the processing for switching selection of the microphone signal of step 5, notifies the microphone selection result displaying means 30 (light emission diodes LED1 to 6) that the speaking party microphone was switched, and thereby informs the speaking party that the communication apparatus 1 has responded to his speech.

In order to eliminate the influence of reflection sound and the standing wave in a room having a large echo, the DSP 25 prohibits the issuance of a new microphone selection command unless the speech end judgment time (for example 0.5 second) passes after switching the microphone. It prepares two microphone selection switch timings from the microphone signal level conversion processing result of step 1 of FIG. 16 and the detection processing result of the speaking party direction of step 3 in the present embodiment.

First method: Time when speech start can be clearly judged

Case where speech from the direction of the selected microphone is ended and there is new speech from another direction.

In this case, the DSP 25 decides that speech is started after the speech end judgment time (for example 0.5 second) or more passes after all microphone signal levels (1) and microphone signal levels (2) become the speech end threshold value level or less and when any one microphone signal level (1) becomes the speech start threshold value level or more, determines the microphone facing the speaking party direction as the legitimate sound pickup microphone based on the information of the sound source direction microphone number, and starts the microphone signal selection switch processing of step 5.

Second method: Case where there is new speech of larger voice from another direction during period where speech is continued In this case, the DSP 25 starts the judgment processing after the speech end judgment time (for example 0.5 second) or-more passes from the speech start (time when the microphone signal level (1) becomes the threshold value level or more). When it judges that the sound source direction microphone number from the processing of 3 changed before the detection of the speech end and it is stable, the DSP 25 decides there is a speaking party speaking with a larger voice than the speaking party which is selected at present at the microphone corresponding to the sound source direction microphone number, determines the sound source direction microphone as the legitimate sound pickup microphone, and activates the microphone signal selection switch processing of step 5.

Figure 17:
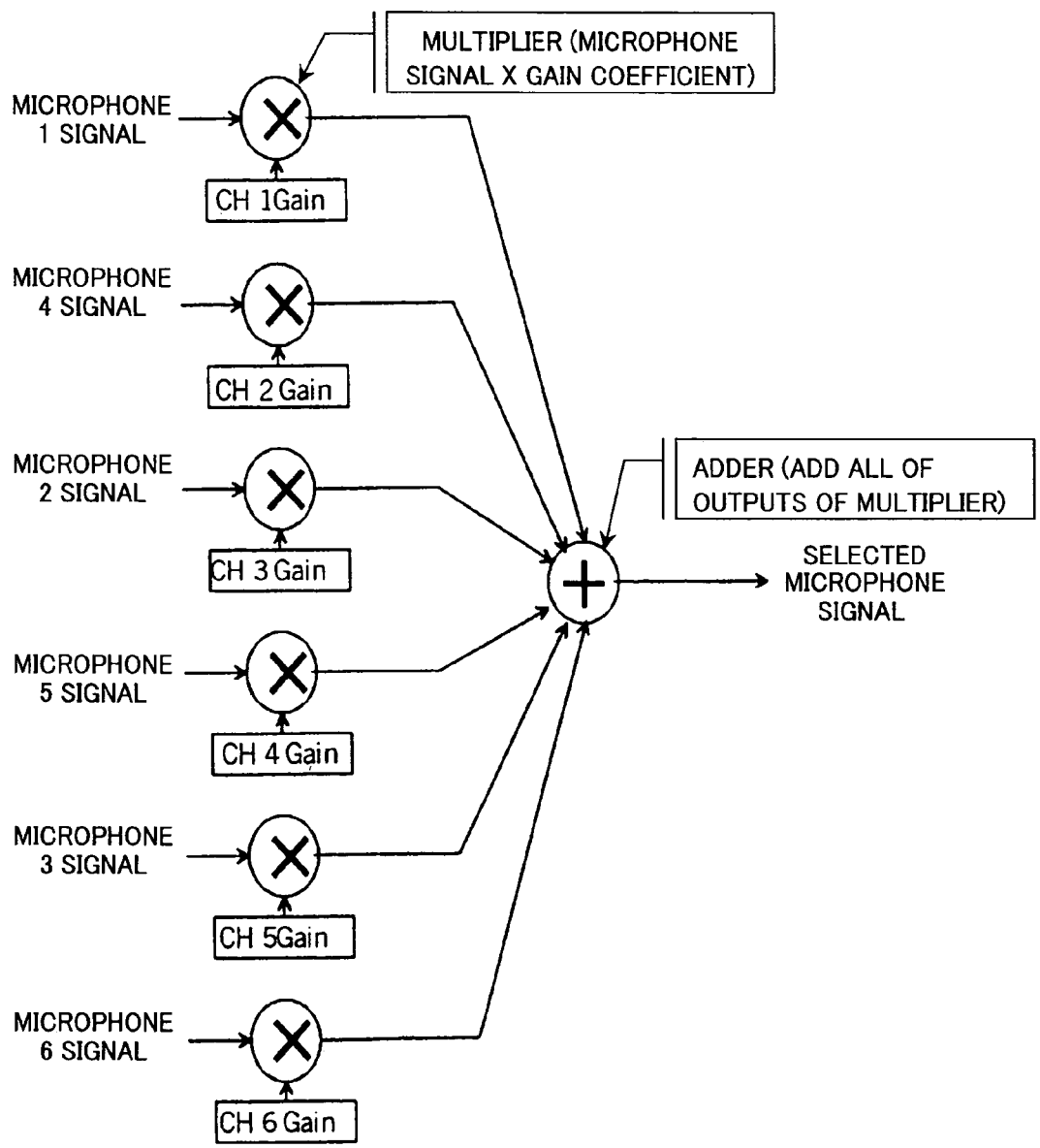
FIG. 17 is a block diagram illustrating microphone switching processing in the communication apparatus of the present invention.
Figure 18:
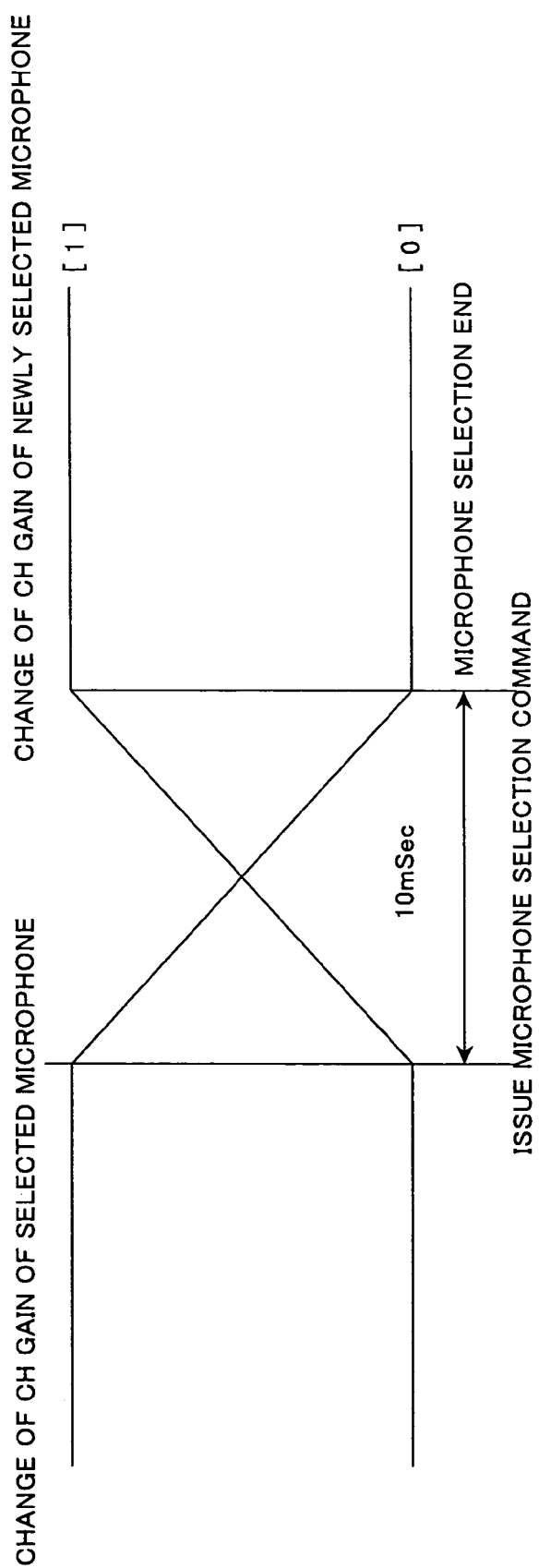
FIG. 18 is a block diagram illustrating a method of the microphone switching processing in the communication apparatus of the present invention.

Processing for Switching Selection of Signal of Microphone Facing Detected Speaking Party The DSP 25 is activated by the command selectively judged by the command from the switch timing judgment processing of the speaking party direction microphone of step 4 of FIG. 16. The processing for switching the selection of the microphone signal of the DSP 25 is realized by six multipliers and a six input adder, as shown in FIG. 17. In order to select the microphone signal, the DSP 25 makes the channel gain (CH gain) of the multiplier to which the microphone signal to be selected is connected [1] and makes the CH gain of the other multipliers [0], whereby the adder adds the selected signal of (microphone signal×[1]) and the processing result of (microphone signal×[0]) and gives the desired microphone selection signal at the output.

Figure 23:
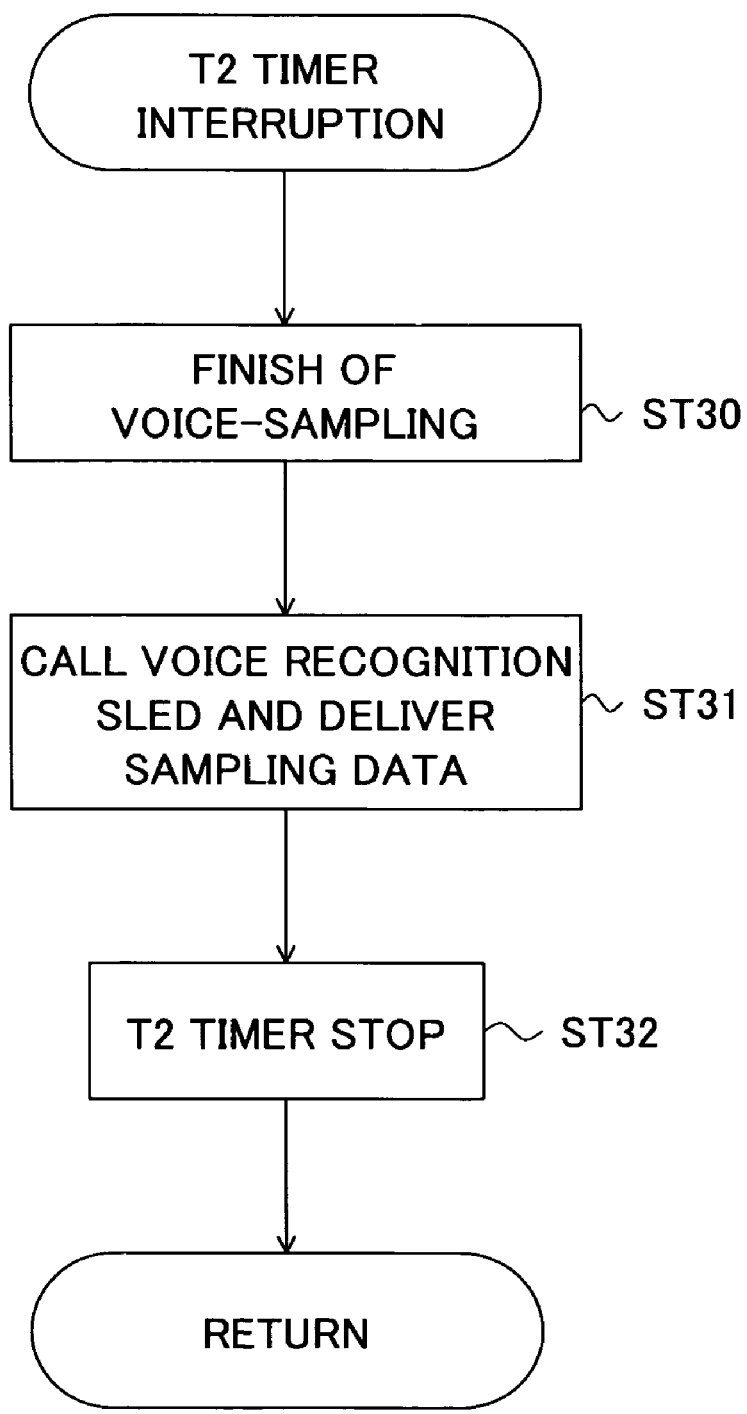

When the channel gain is switched to [1] or [0] as described above, there is a possibility that a clicking sound will be generated due to the level difference of the microphone signals switched. Therefore, in the two-way communication apparatus 1, as illustrated in FIG. 23; the change of the CH gain from [1] to [0] and [0] to [1] is made continuous for the switch transition time, for example, a time of 10 msec, to cross and thereby avoid the clicking sound due to the level difference of the microphone signals.

Further, by setting the maximum channel gain to other than [1], for example [0.5], the echo cancellation processing operation in the later DSP 25 can be adjusted.

As explained above, the communication apparatus of the first embodiment of the present invention can be effectively applied to a two-way conference such as conference without the influence of noise. Naturally, the communication apparatus of the present invention is not limited to conference use and can be applied to various other purposes as well. Namely, the communication apparatus of the first embodiment of the present invention is also suited to measurement of the voltage level of the pass band when it is not necessary to stress the group delay characteristic of the pass bands. Accordingly, for example, it can also be applied to a simple spectrum analyzer, a level meter for applying fast fourier transform (FFT) processing (FFT like meter), a level detection processor for confirming the equalizer processing result of a graphic equalizer etc., level meters for car stereos, radio cassette recorders, etc., etc.

The communication apparatus of the first embodiment of the present invention has the following advantages from the viewpoint of structure:

(1) The positional relationships between the plurality of microphones having the single directivity and the receiving and reproduction speaker are constant and the distances between them are very close, therefore the level of the sound output from the receiving and reproduction speaker directly returning is overwhelmingly larger and dominant than the level of the sound output from the receiving and reproduction speaker passing through the conference room environment and returning to the plurality of microphones. Due to this, the characteristics of the sound reaching from the receiving and reproduction speaker to the plurality of microphones (signal levels (intensities), frequency characteristics frequency characteristics and phases) are always the same. That is, the communication apparatus of the present invention has the advantage that the transmission function is always the same.

(2) Therefore, there is the advantage that there is no change of the transmission function when switching the microphone, therefore it is not necessary to adjust the gain of the microphone system whenever the microphone is switched. In other words, there is the advantage that it is not necessary to re-do the adjustment when the adjustment is once carried out at the time of manufacture of the communication apparatus.

(3) Even if the microphone is switched for the same reason as the above description, the number of echo cancellers configured by the digital signal processor (DSP) may be kept to one. A DSP is expensive, and also the space for arranging the DSP on the printed circuit board, which has little empty space since various members are mounted, may be kept small.

(4) The transfer function between the receiving and reproduction speaker and the plurality of microphones is constant, so there is the advantage that the adjustment of the sensitivity difference of a microphone per se of ±3 dB can be carried out just by the unit.

(5) As the table on which the communication apparatus is mounted, usually use is made of a round table. It became possible to utilize this as the speaker system for equally distributing audio having a uniform quality in the entire orientation by one receiving and reproduction speaker in the communication apparatus.

(6) The sound output from the receiving and reproduction speaker is propagated through the table surface by the boundary effect and good quality sound effectively, efficiently, and equally reaches the conference participants, the sound at the opposing side is cancelled in phase in the ceiling direction of the conference room to become a small sound, there is a little reflection sound from the ceiling direction to the conference participants, and as a result a clear sound is distributed to the participants.

(7) The sound output from the receiving and reproduction speaker simultaneously arrives at all of the plurality of microphones with the same volume, therefore it becomes easy to decide the sound is audio of a speaking party or received audio. As a result, erroneous decision in the microphone selection processing is reduced.

(8) By arranging an even number of microphones at equal angles radially and at equal intervals, the level comparison for detecting the direction can be easily carried out.

(9) By the dampers using a buffer material, the microphone support members having flexibility or resiliency, etc., the influence upon the sound pickup of the microphones due to the vibration of the sound of the receiving and reproduction speaker transmitted via the printed circuit board on which the microphones are mounted can be reduced.

(10) The sound of the receiving and reproduction speaker does not directly enter the microphones. Accordingly, in this communication apparatus, there is a little influence of the noise from the receiving and reproduction speaker.

The communication apparatus of the first embodiment of the present invention has the following advantages from the viewpoint of the signal processing:

(a) A plurality of single directivity microphones are arranged at equal intervals radially to enable the detection of the sound source direction, and the microphone signal is switched to pick up sound having a good S/N and clear sound and transmit it to the other parties.

(b) It is possible to pick up sounds from surrounding speaking parties with a good S/N and automatically select the microphone facing the speaking party.

(c) In the present invention, as the method of the microphone selection processing, the pass audio frequency band is divided and the levels at the times of the divided frequency bands are compared to thereby simplify the signal analysis.

(d) The microphone signal switch processing of the present invention is realized as signal processing of the DSP. All of the plurality of signals are cross faded to prevent a clicking sound from being issued when switching.

(e) The microphone selection result can be notified to microphone selection result displaying means such as light emission diodes or the outside. Accordingly, it is also possible to make good use of this as speaking party position information for a TV camera.

Second Embodiment

A communication apparatus of a second embodiment according to the present invention will be described with reference to FIGS. 19 to 24.

Until now, a telephone, an interphone, a television telephone or the like is used for transferring the content of a conference of a human voice to another person or other persons, apart from that sound source. In this case, there are frequently noises such as voices of the surrounding persons, sound from a television set, and thus the clear sound of the speaker may not be transferred to another person. Then, sometimes, it is required the troublesome works, such as, moving and approaching the speaker to the microphone, speaking in a loud voice, or lowering the sound from the television set.

The communication apparatus of the first embodiment can eliminate such the noises of the surrounding of the communication apparatus, and discriminate the speaker correctly, discussed above, however, it is required the further improved communication apparatus.

A second embodiment of a communication apparatus, as an improved communication apparatus to the first embodiment of the communication apparatus, adopts a voiceprint authentication by which only voices of speakers which were previously registered are clearly selected, reduces levels of other sounds which may be noises, and achieves a good communication.

Figure 19:
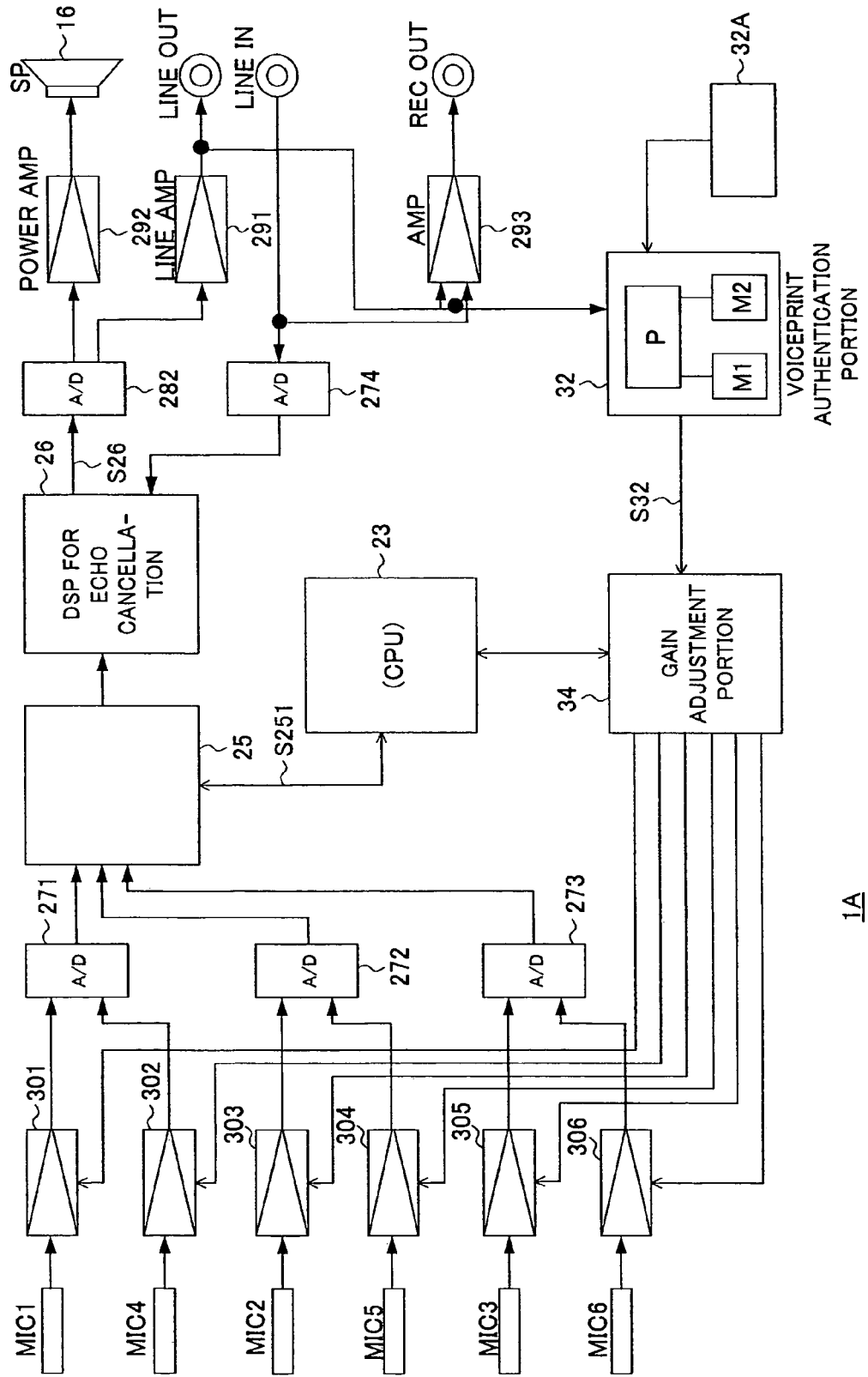
FIG. 19 is a block diagram illustrating the communication apparatus of a second embodiment of the present invention.

FIG. 19 is a view showing a configuration of the communication apparatus of the second embodiment. The communication apparatus 1A shown in FIG. 19 has a configuration similar to that of the communication apparatus 1 shown in FIG. 5, and the same components are borne same reference numerals. The differences are as follows.

In the communication apparatus 1A of the second embodiment, gain variable type amplifiers 301 to 306 are arranged between the microphones MC1 to MC6 and the A/D converters 271 to 273, a voiceprint authentication portion 32 is added, an amplifier gain adjustment portion 34 is added, an output signal of the amplifier 291 is applied to the LINE OUT terminal and to the voiceprint authentication portion 32. Note, as described in the first embodiment, the A/D converters 271 to 273 can be configured as the A/D converters 271 to 273 having a function of a gain adjustment and amplification (gain variable and amplification type A/D converter), and then, the functions of the gain variable type amplifiers 301 to 306 can be included in the A/D converter 271 to 273. In the second embodiment, a case where the A/D converters 271 and 273 and the independent gain variable type amplifiers 301 to 306 are provided will be described.

In the second embodiment, a third amplifier 293 is further added to form the circuit construction where the input signal from LINE IN or a signal from the amplifier 293 can be outputted to the sound recording output terminal REC OUT.

The six microphones MC1 to MC6 have the directivity (directional characteristic) as shown in FIG. 6, and are radially arranged at equal angle and equal distance.

Each of the A/D converters 271 to 273 is a two channel A/D converter and inputs two channels of input signals, as in the first embodiment.

The first DSP (digital signal processor) 25 performs a variety of processings listed up in FIG. 9 and described in the first embodiment, for example, the processing of the microphone selection and switching.

The second DSP 26 performs the echo cancellation processing as described in the first embodiment.

The voiceprint authentication portion 32 comprises a voiceprint authentication processing processor P for carrying out the voiceprint authentication, a dictionary memory M for carrying out a voiceprint processing and a voiceprint register memory M2 for registering voiceprints. The voiceprint register memory M2 previously registers the voiceprints for speakers to which the voiceprint authentication is tried, by a voiceprint register apparatus 32A. Persons to be voiceprint-authenticated are conference attendants (participants) using the communication apparatus 1A, in the second embodiment. The details of the processing of the voiceprint authentication portion 32 will be described.

The DSP 21 selects one of the microphones MC1 to MC6 and outputs a microphone selection signal S251 indicating the selected microphone number to the microprocessor 23, similar to that of the first embodiment. The microprocessor 23 outputs the microphone selection signal S251 to the amplifier gain adjustment portion 34.

The microphone picked up signal selected by the DSP 25 is applied to the DSP 26, the DSP 26 performs the echo cancellation processing and outputs the same to the D/A converter 282 and the amplifier 292 to output the amplified sound from the receiving and reproducing speaker 16. As a result, the conference attendants using the communication apparatus 1A can hear the voice of the speaker used the selected microphone through the receiving and reproducing speaker 16.

The selected voice signal S26 output to the D/A converter 282 from the DSP 26 is outputted to LINE OUT terminal through the amplifier 291 and can be transferred to the another communication apparatus described with reference to FIG. 1. Also, the selected voice signal S26 output to the D/A converter 282 from the DSP 25 is outputted to REC OUT terminal through the amplifier 293, and can be recorded. Further, the selected voice signal S26 outputted to the D/A converter 282 from the DSP 26 is outputted to the voiceprint authentication portion 32, and the voiceprint authentication portion 32 carries out the voiceprint authentication to the selected voice signal S26. The detail of the voiceprint authentication will be described later. The voiceprint authentication 32 carries out the voiceprint authentication to the selected voice signal S26 and outputs an authentication passing signal S32, where S32 is "1" when the selected voice signal S26 coincides with the voiceprint registered in the voiceprint register memory M2, i.e., the authentication is passed (success), or S32 is "0" when the authentication is not passed (fault), to the amplifier gain adjustment portion 34.

The amplifier gain adjustment portion 34 is inputted the microphone selection signal S25 from the DSP 25 through the microprocessor 23. In this state, the authentication passing signal S32 indicating the passed (success) authentication to the amplifier gain adjustment portion 34 from the voiceprint authentication portion 32, then, the amplifier gain adjustment portion 34 raises a gain of the gain variable type amplifier to which the microphone output signal indicated by the microphone selection signal S251 is applied, or maintains the gain when the gain is already raised that high level, or sets a predetermined high level, otherwise, reduces gains of the other gain variable type amplifier, or maintains the gains when the gains are already reduced to that low level or sets a predetermined low level.

Specifically, the amplifier gain adjustment portion 34 includes a microcomputer, and that microcomputer sets the gain set value at a high level for the gain variable type amplifier corresponding to the selected microphone output signal indicated by the microphone selection signal S251 and outputs the same to that gain variable type amplifier, otherwise, sets gain set values of other gain variable type amplifiers at a low level and outputs the same to those gain variable type amplifiers. As a result, the gains of the gain variable type amplifiers 301 to 306 are changed to the input gain set values.

For example, when the first microphone picks up only the sound from the TV set, and the sound level is high, the DSP 25 selects the first microphone. As a result, the DSP 25 outputs the microphone selection signal S251 indicating the selection of the first microphone MC1 to the amplifier gain adjustment portion 34 through the microprocessor 23. The sound signal output from the TV set and selected by the DSP 25 is inputted to the voiceprint authentication portion 32 through the amplifier 291 as the selected voice signal S26. Since the voiceprint register memory M2 does not register that sound output from the TV set, the voiceprint authentication portion 32 determines a status where an authentication is not passed (is fault) for the sound, and outputs the authentication passing signal S32 of "0" to the amplifier gain adjustment portion 34. The amplifier gain adjustment portion 34 is already inputted the microphone selection signal S251 indicating the selection of the first microphone MC1, however, is inputted the authentication passing signal S32 of "0", then, the amplifier gain adjustment portion 34 sets the gain set value at a low level for the gain variable amplifier 301 connected to the first microphone MC1 indicated by the selection signal S251 and outputs the same to the amplifier 301 to reduce the gain of the amplifier 301. As a result, the sound picked up by the first microphone is reduced at a low level and is outputted to the A/D converter 271, and, thereafter, that sound of the TV set is probably treated as an out-of-selection.

Contrary, when a voiceprint of a speaker using the third microphone MC3 is previously registered to the voiceprint register memory M2 of the voiceprint authentication portion 32 and the third microphone MC3 is selected by the DSP 25, the DSP 25 outputs the microphone selection signal S251 indicating the selection of the third microprocessor MC3 to the amplifier gain adjustment portion 34 through the microprocessor 23, the voice picked by the third microphone MC3 is inputted to the voiceprint authentication portion 32, as the selected voice signal S26 and is tried the voiceprint authentication. In this case, since the voiceprint of the speaker using the third microphone MC3 is registered to the voiceprint register memory M2, the voiceprint authentication will pass and the authentication pass signal S32 of "1" will be issued.

When the amplifier gain adjustment portion 34 inputs the authentication pass signal S32 of "1", the amplifier gain adjustment portion 34 refers the microphone selection signal S251 now indicating the selection of the third microphone MC3, sets the gain set value for the gain variable type amplifier 305 applied with the output signal of the third microphone MC3 at a high level and outputs the same to the amplifier 305 to set the gain of the amplifier 503 at the high level. As a result, the sound signal picked up by the third microphone MC3 is raised it level at the gain variable type amplifier 305, and inputted to the A/D converter 273, and a high level voice output is outputted from the DSP 25, as the selected voice signal S26. That selected voice signal S26, of course, is converted to an analog signal at the D/A converter 282, and the converted analog signal is amplified in the amplifier 292 and the amplified voice is outputted to the sound receiving and reproducing speaker 16. The signal amplified by the amplifier 291 is transferred to the another communication apparatus through the LINE OUT terminal and inputted to a voiceprint authentication portion in the another communication apparatus and may be tried the voiceprint authentication.

If there are the sound of the TV set picked up by the first microphone MC1 and the voice picked up by the third microphone MC3 at the same time, first, the DSP 25 selects the sound having a high level than the other, and the selected sound is inputted to the voiceprint authentication portion 32 as the selected voice signal S26. If the sound of the TV set picked up by the first microphone MC1 is higher than the voice of the third microphone MC3, the sound of the TV set is selected by the DSP 25 and outputted from the DSP 25 as the selected voice signal S26. However, such the selected voice signal S26 is not authenticated by the voiceprint authentication portion 32, as described above. The gain of the gain variable type amplifier 301 connected to the first microphone MC1 is set at a low level. Thereafter, the sound signal picked up by the first microphone MC1 is not selected in the microphone selection processing of the DSP 25, in turn, the voice signal picked up by the third microphone MC3 can be selected at the DSP 25. Such the voice signal picked up by the third microphone MC3 is inputted to the voiceprint authentication portion 32 from the DSP 25, as the selected voice signal S26, then, such the selected voice signal S26 would be passed the voiceprint authentication. As a result, the amplifier gain adjustment portion 34 sets the gain of the gain variable type amplifier 305 connected to the third microphone MC3 at a high level, the level of the voice signal picked up by the third microphone MC3 becomes high and the resultant clear voice is outputted from the sound receiving and reproducing speaker 16 and is also outputted to another communication apparatus through LINE OUT and may be inputted the voiceprint authentication portion therein.

In this way, the voice spoken by the speaker of which the voiceprint is registered to the voiceprint register memory M2 in the voiceprint authentication portion 32 is finally selected, and that voice is outputted to LINE OUT terminal and then the voiceprint authentication 32 of the another communication apparatus, and the sound receiving and reproducing speaker 16 in a clear voice.

Accordingly, by using the communication apparatus 1A of the second embodiment, as shown in FIG. 1, clear voice conversation can be easily realized between persons apart form each other.

Even if the communication apparatus 1A is installed in a noisy environment such as a noisy sound of the TV set, in the communication apparatus 1A of the second embodiment, it is not required the movement of the speakers for approaching the microphones, and/or, speaking a loud voice or shouting.

Also, it is unnecessary to reduce the sound level of the TV set during the use of the microphones, and the troublesome work is not necessary. In turn, the DSP 25 reduces such the sound level of the TV set, and the reduced sound of the TV set is transferred to the another communication apparatus, and thus the conference attendants using the another communication apparatus can hear only clear voice of the speaker to thereby achieve a good and smooth conversation. In this regard, the communication apparatus 1A of the second embodiment functions as a noise suppressor for suppressing (eliminating) unnecessary noise.

Of course, when a third party or person of which a voiceprint is not registered to the voiceprint register memory M2 of the voiceprint authentication portion 32 speaks around the communication apparatus 1A, such the voice is not finally selected and is not outputted to the another communication apparatus. Namely, the communication apparatus 1A of the second embodiment omits such the sound of which the voiceprint is not registered.

As illustrated in FIG. 14, the DSP 25 determines the termination of the selection of the microphone when the output signal of the microphone is reduced and such the status is continued for a predetermined period. At this time, preferably, the amplifier gain adjustment portion 34 resets the gain set value of the gain variable type amplifier corresponding to the microphone on the termination of the speech to a normal gain value. Of course, such the termination of selection is included in the microphone selection S251 and transferred to the amplifier gain adjustment portion 34 from the DSP 25 through the microprocessor 23. By resetting the gain set value of the gain variable type amplifier corresponding to the microphone just terminated it use (selection), the next microphone selection conditions become equal for all the microphones MC1 to MC6.

In the above description, as the gain variable type amplifying means of the of the present invention, the gain variable type amplifiers 301 to 306 are described, however, as described above, the gain variable type A/D converters 271 to 273 can be used in stead of the A/D converters 271 to 273. Then, the gain variable amplifiers 301 to 306 are replaced by gain fixed type amplifiers, and the amplifier gain adjustment portion 34 can adjust (set) the gains of the gain variable type A/D converters 271 to 273.

As a preferred arrangement of the microphones of the present invention, the description was made that the microphones MC1 to MC6 are arranged radially at equal angle, but, in the second embodiment, it is not limited to such the preferred arrangement of the microphones MC1 to MC6. Specifically, as shown in FIG. 4, it is not necessary to arrange the first and fourth microphones MC1 and MC4 in line at opposed position. Even in the arrangement of the microphones is not regularly, the DSP 25 of the communication apparatus 1A of the second embodiment detects the voice signal having the largest level, selects the corresponding microphone and outputs the microphone selection signal S251 indicating that microphone. Of course, the voice authentication portion 32 performs the voiceprint authentication discussed above. Details of the processing in the voiceprint authentication portion 32 will be described with reference to FIGS. 20 to 24.

In the second embodiment, each of the conference attendants speaks to the corresponding microphone in order, to input each voice to the voiceprint registration apparatus 32A. The voiceprint registration apparatus 32A outputs the input voice together with the number of the microphone to the voiceprint authentication portion 32. In this example, the voice of each of the conference attendants is short commands, for example, 2 to 3 seconds, speaking "Open File", "Next" etc, instructing the operation of the communication apparatus 1A.

The voiceprint authentication processor P in the voiceprint authentication portion 32 converts the voice signal input from the voiceprint register apparatus 32A into a digital signal, performs the voice recognition processing with reference to a dictionary recorded in the dictionary memory M1, converts (translates) the same into a character series data and stores the same together with the number of the microphone into the voiceprint register memory M2. Namely, the voiceprint authentication processor P compares the input voice signal with the character series data corresponding to the voice commands of the dictionary memory M1 in which the character series data corresponding to the input voice command are previously stored, and selects the matched data.

FIGS. 20A to 20D are timing charts illustrating the control operation performed in the voice recognition processing portion 32. FIG. 20A is a timing chart of the microphone switching signal MC_SEL, and shows, for example, that the fourth microphone MC4 is currently selected when #4 is indicated. FIG. 20B is a timing chart of the microphone output signal. The microphone output signal is the voice signal corresponding to the number of the microphone indicated by the microphone switching signal MC_SEL shown in FIG. 20A, and this signal is converted to the digital signal by the A/D converter in the voice authentication processor P and the digital converted signal is inputted. In this example, the voice signal is the voice signal indicating the commands such as "Open File", "Next" of the microphone output signal. FIG. 20C is a timing chart showing the processing process carried out in the voiceprint authentication processing processor P with reference to the information obtained in FIGS. 20A and 20B. The processing is constructed by the buffering of each voice data and the voice recognition processing after the buffering. FIG. 20D is a timing chart of the character series data sequentially outputted as the result of the voice recognition processing shown in FIG. 20C.

As illustrated in FIG. 20A, the first selected microphone number in #4, and the microphone output signal of "Open File" is inputted to the voice recognition processing processor P from the fourth microphone. The voice recognition processing processor P inputs the microphone output signal converted to the digital signal by the A/D converter, starts the buffering as shown in FIG. 20C to hold the voice data in the buffer corresponding to the microphone number #4.

Thereafter, the microphone number is changed from #4 to #1, then the microphone switching signal MC_SEL becomes "1". As shown in FIG. 20B, the voice data of the microphone number #1 is the voice data corresponding to "Next", then, the voiceprint authentication processing processor P terminates the buffering for the microphone number #4, newly starts the buffering for the microphone number #1, and at the same time, the voiceprint authentication processing processor P carries out the voice recognition on the basis of the voice data of the microphone number #4 hold in the buffer in parallel.

In the voice recognition processing, the voice data of the microphone number #4 is processed the voice recognition, is compared with command groups of the character series data stored in the dictionary memory M1, is selected if matched, and outputted the character series data of "Open File" as shown in FIG. 20D.

Thereafter, the above processing is carried out when the microphone number is changed from #1 to #2.

The control operation roughly described above will be described with reference to the flow charts.

Figure 21:
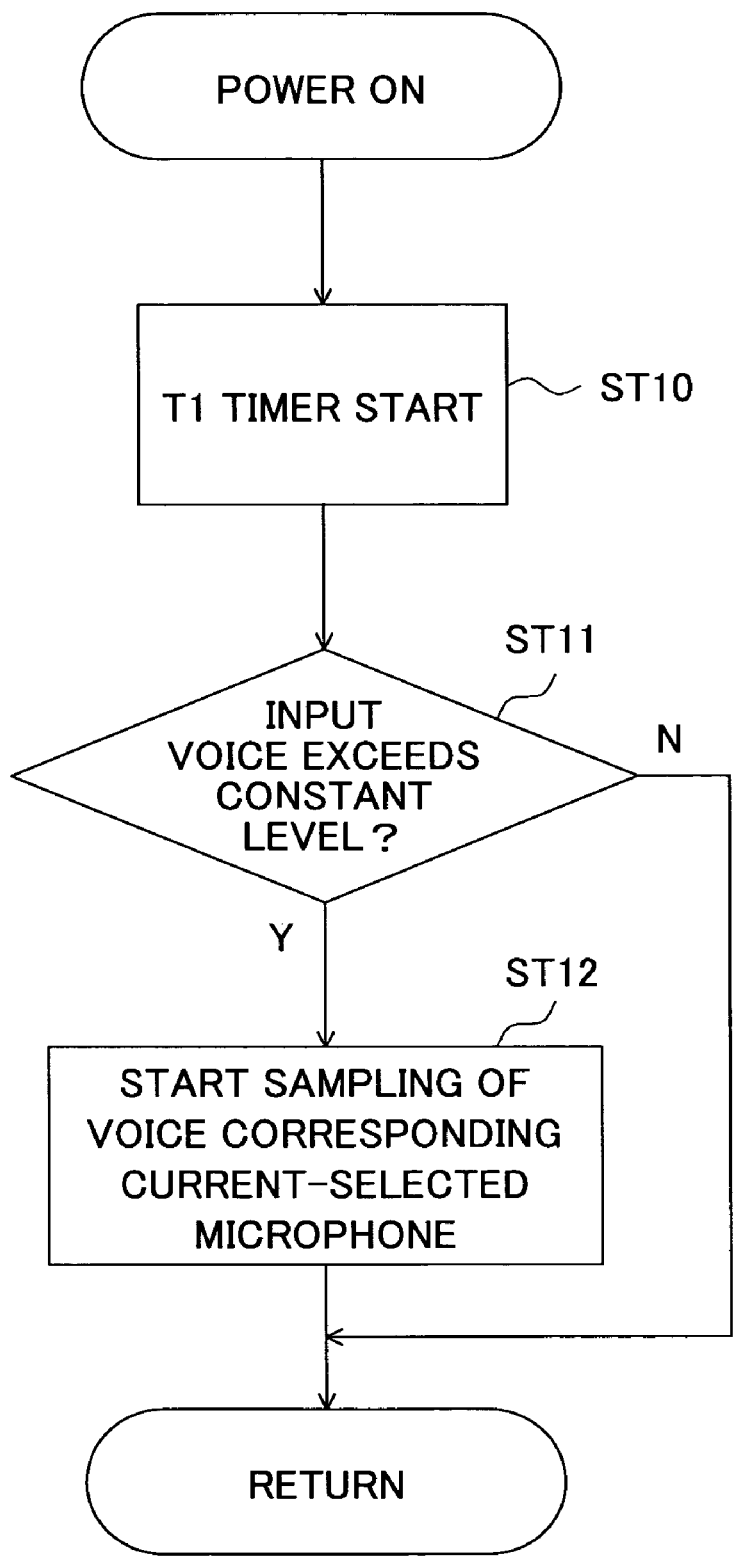
FIGS. 21 to 24 are flow charts showing the processing in the voiceprint authentication portion illustrated in FIG. 19.
Figure 22:
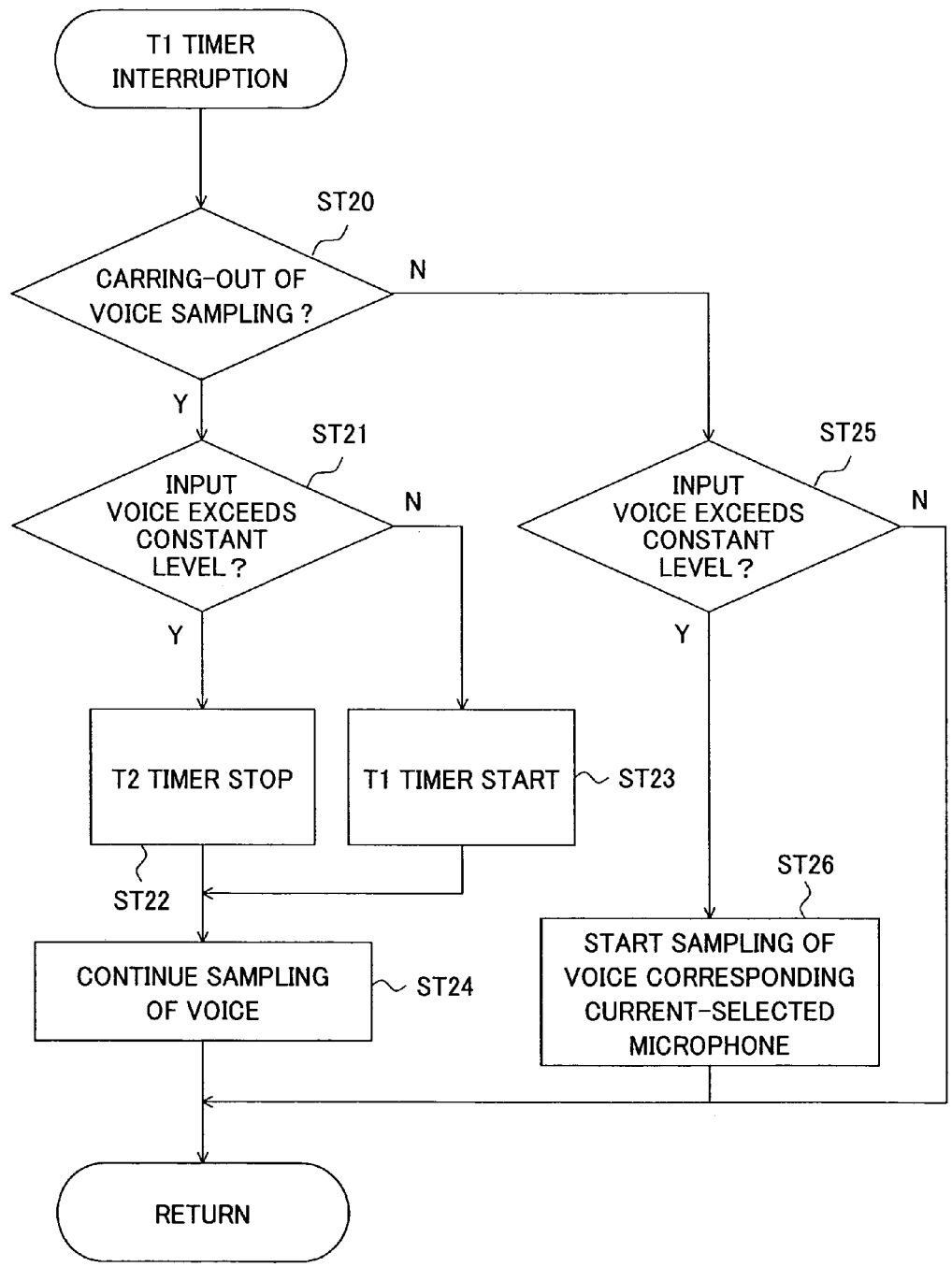

FIG. 21 is a view showing a main flow of the control performed in the voiceprint authentication processor P. For example, T1 timer of 2 kHz starts, and the operation is transferred to the interruption processing of T1 timer every 50 MS as shown in FIG. 22. There is the voice input exceeding a predetermined level (step ST11), then the operation is transferred to step ST12. Of course, the threshold of the above predetermined level can be set arbitrarily for the need of the application. Since the microphone switching signal MC_SEL is supplied, at step ST11, the voiceprint authentication processing processor P holds the microphone number of the voice of which the level exceeds the predetermined level. Accordingly, at step ST12, the sampling for the input voice data is started and the sampled voice data is held in the buffer corresponding to the microphone number. If there is not the input voice exceeding the predetermined level the processor P does not perform any operation at step ST12.

Figure 24:
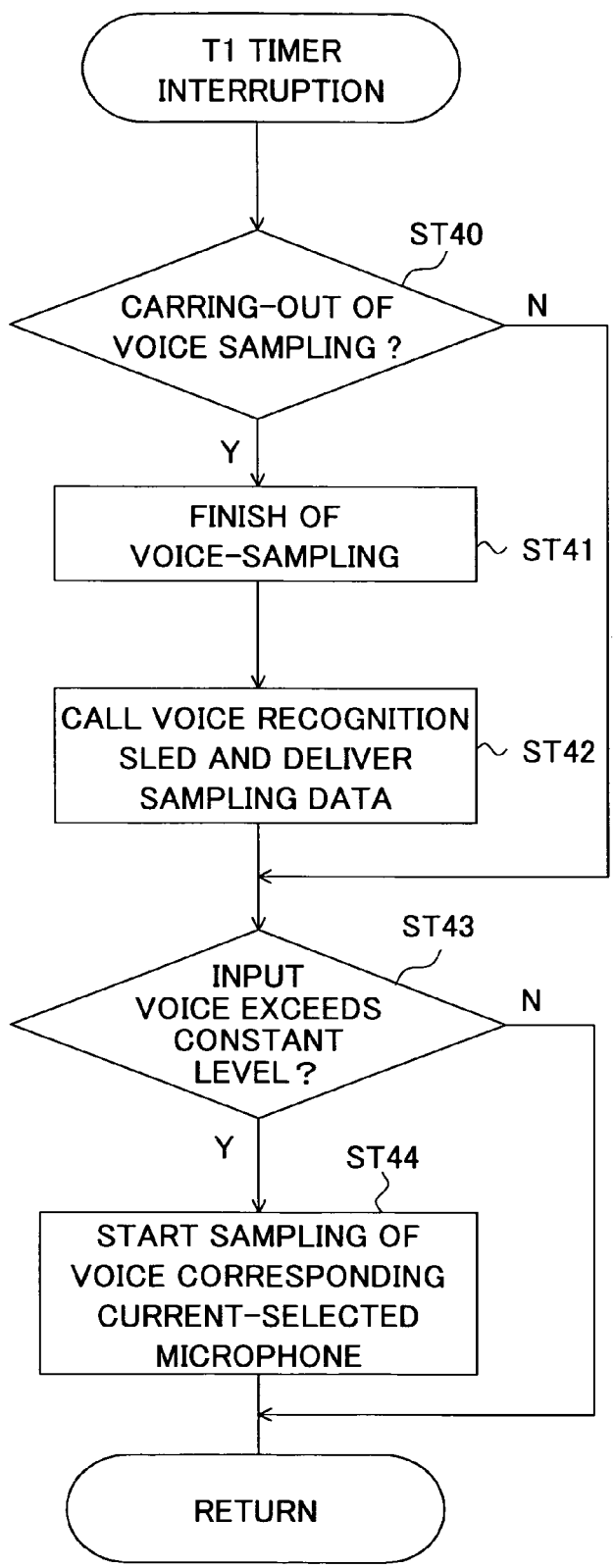

FIG. 24 is a view showing the interruption flow when the microphone selection information is changed in the control of the main flow. Namely, this is an interruption processing flow (operation) occurred when in the main flow which is a normal control operation, the microphone number which will be selected by the DSP 25 is changed, the change information is included in the microphone switching signal MC_SEL and noticed thereto. In the example in FIG. 20, the process shows when the voice data of the microphone number 4, microphone switching signal MC_SEL=4, is sampling and buffering to the buffer of the microphone number 4 before the regular interruption, the content of the microphone switching signal MC_SEL is changed from "4" to "1".

At step ST40 of FIG. 24, the voiceprint authentication processing processor P does not store the voice data to the buffer any more when the processor P carries out the sampling of the voice data. In this case, the processor P judges as the termination of the inputting the speech from the microphone of the number "4", currently performed, and terminates the sampling (step ST41).

Further the voice data of the microphone number "4" which was terminated the sampling is performed the voice recognition processing at the voiceprint authentication processing processor P (step ST42). In the sample, the voice data of the microphone number "4" is recognized as "Open File" in the voiceprint authentication processor P and the character series data is output outside of the communication apparatus 1A.

At step ST10 of FIG. 21, T1 timer starts and the T1 timer interruption operation starts every 50 ms (20 kHz), for example, as shown in FIG. 22. The T1 timer interruption operates monitors whether or not there is the voice input every 50 ms and the voice input exceeds the predetermined level, and carries out a suitable processing.

At step ST20, it is checked whether or not the sampling of the voice has been carried out. If the sampling of the voice has been carried out, the voiceprint authentication processing processor P further checks whether or not the voice input exceeds the predetermined level (step ST21), and stops T2 timer described later when there is the voice input exceeds the predetermined level. T2 timer is used for monitoring a state where there is not speech, and for automatically transferring the operation mode to the voice recognition as a next phase when there is not speech in a predetermined time. When there is the speech, in other words, the voice input exceeds the predetermined level, it is deemed that the speech continues and T2 timer is reset at step ST22.

The sampling of the voice is carried out at step ST20, but if there is not the voice input not exceeding the predetermined level, it is supposed that the current speech may be terminated, then T2 timer is triggered to start for monitoring the continuation time where there is not speech (step ST23).

Even in there is not the voice exceeding the predetermined level at step ST21, since there is a possibility for restarting the speech, the sampling of the voice will be continued (step ST24).

The sampling of the voice is not carried out at step ST20, then, the voiceprint authentication processing processor P checks whether or not there is the voice input exceeding the predetermined level. As a result, a status of whether or not the speech begins is checked, if there is the voice input exceeding the predetermined level, the voiceprint authentication processing processor P recognizes the start of the speech, and starts the sampling of the voice to the buffer corresponding to a newly selected microphone. If there is not the voice input exceeding the predetermined level, at step ST25, then the voiceprint authentication processing processor P does not perform any action and waits until coming a next effective speech.

At step ST23 of FIG. 22, T2 timer of 2 Hz, for example, is started and a predetermined time is passed, namely, the voiceprint authentication processing processor P performs the voice sampling (step ST20, but there is not the voice input exceeding the predetermined level and the predetermined time is continued in such the condition), it is waste for continuing the voice sampling, and thus the operation will be transferred to the T2 timer interruption operation shown in FIG. 23. Namely, the sampling of the voice, currently performed, is terminated (step ST30), and the operation will be transferred to the voice recognition processing (step ST31). After transferred to the voice recognition processing, at step ST32, T2 timer is reset for the next speech processing.

According to the voiceprint authentication portion 32, even if a plurality of conference attendants use the microphones at the same time and issue the commands by voice in a overlapping state to the communication apparatus 1A, the sound pressure levels of each frequency band of each voice is analyzed by the DSP 25 to specify a main speaker and the voice signal thereof is selected. Accordingly, if the plurality of voice commands are inputted at the same time, the waste and wrong recognition processing can be avoided and the voiceprint authentications portion 32 can suitably perform it authentication to a mainly speaking voice command.

The voiceprint authentication processing processor P of the voiceprint authentication portion 32 performs the buffering of the delivered voice command signal, the voice recognition processing of the buffered voice signal, compares the same with the command character data stored in the dictionary memory M1 and select the matched character series data.

The voiceprint authentications processing processor P in the voiceprint authentication portion 32 receives the selected microphone number from the voiceprint register apparatus 32A at each selection time. Accordingly, if the selected microphone number is changed, the processor P stops the buffering and performs the voice recognition processing to the buffered voice signal and starts the buffering for the voice signal of the changed microphone number. Consequently, an accuracy of the voice recognition is improved.

Third Embodiment

A conference apparatus as a third embodiment according to the present invention will be described with reference to FIGS. 25 and 26.

The third embodiment will be described a case where the communication apparatuses 1 and 1A of the first and second embodiments are used and an imaging means is added to the communication apparatuses to construct a television (TV) conference system.

In the conventional conference system with a TV camera, the direction of the TV camera is controlled by the number of the microphone provided for each speaker or a chairman (or administrator) of the TV conference system. To realize such method, it is required individual microphones for the speakers and the introduction of an expensive system is inevitable. Also, it is inevitable the troublesome works such as the change of the imaging direction of the TV camera by the chairman of the TV conference system to take a picture of the speaker when the speaker is changed. Further, when a name of the speaker is also displayed with his picture, normally, the microphone and the name of the speaker are associated, then, if the seat sitting the attendant is changed, such the association of the name and the microphone must be reset.

There is known a simple system for changing the direction of the TV camera to the sound, however, such the simple system has the disadvantages that the direction of the TV camera is directed to a unreasonable direction sometimes, in response to the surrounding noise, for example, the sound of a fan of projector used in the conference, etc. Namely, the TV camera may frequently take a picture of the projector.

The communication apparatus described as the first and second embodiments, have the advantages that the selection is correct, it is not necessary to locate the microphones adjacent to the conference attendant, the noise and/or unnecessary sounds can be eliminated, etc.

For example, in the communication apparatus 1 of the first embodiment, the plurality of microphones MC1 to MC6 are arranged to direct (orient) the entire directions as shown in FIG. 4, and the first digital signal processor (DSP) 25 selects the voice signal picked up by the microphone directing the current speaking speaker. Namely, the communication apparatus 1 selects the correct speaker or the microphone of him.

Further, the communication apparatus 1A added the voiceprint authentication portion 39 to the communication apparatus 1 of the first embodiment, reliably selects the correct speaker or the microphone of him.

Figure 25:
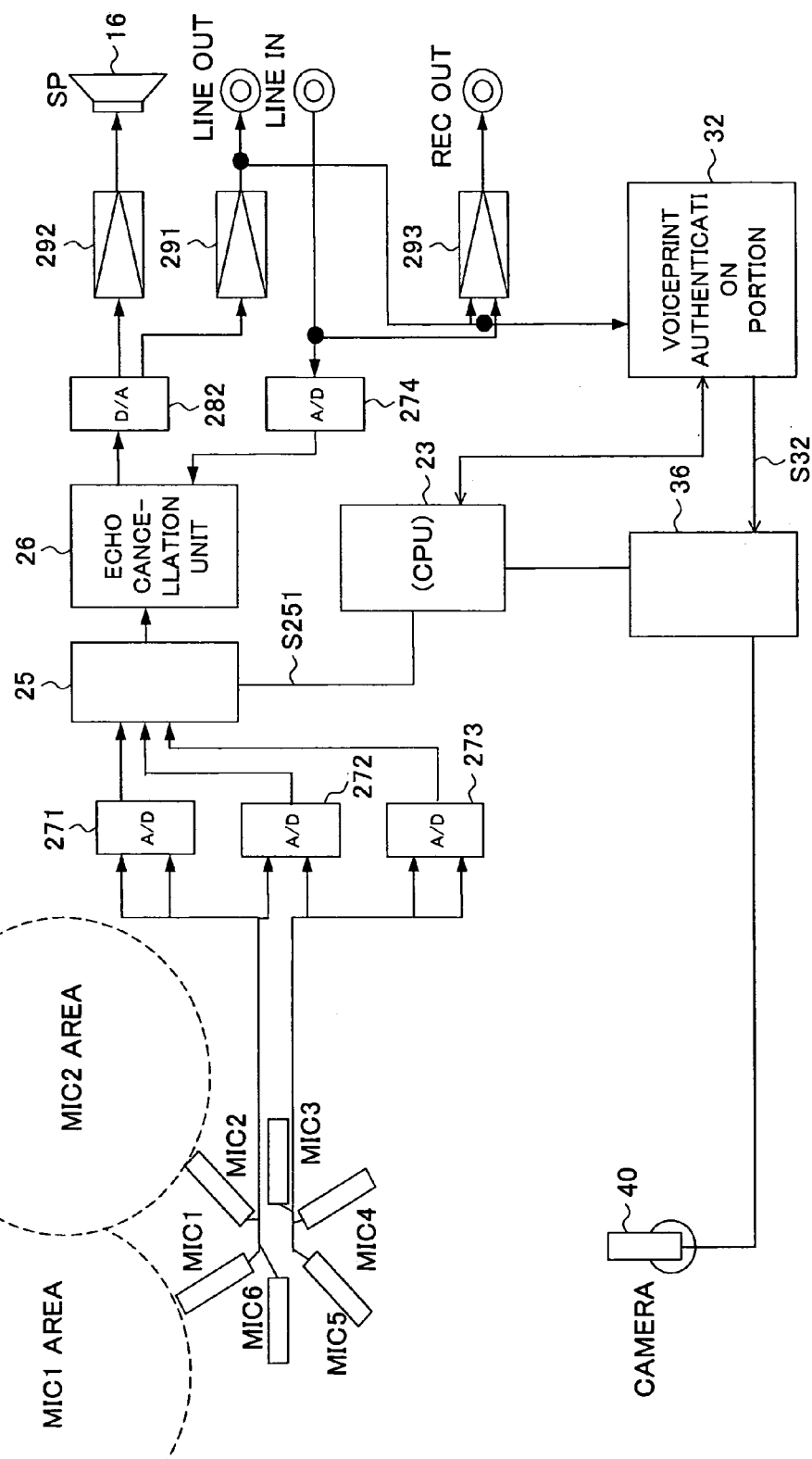
FIG. 25 is a block diagram illustrating the conference apparatus of a third embodiment of the present invention.
Figure 26:
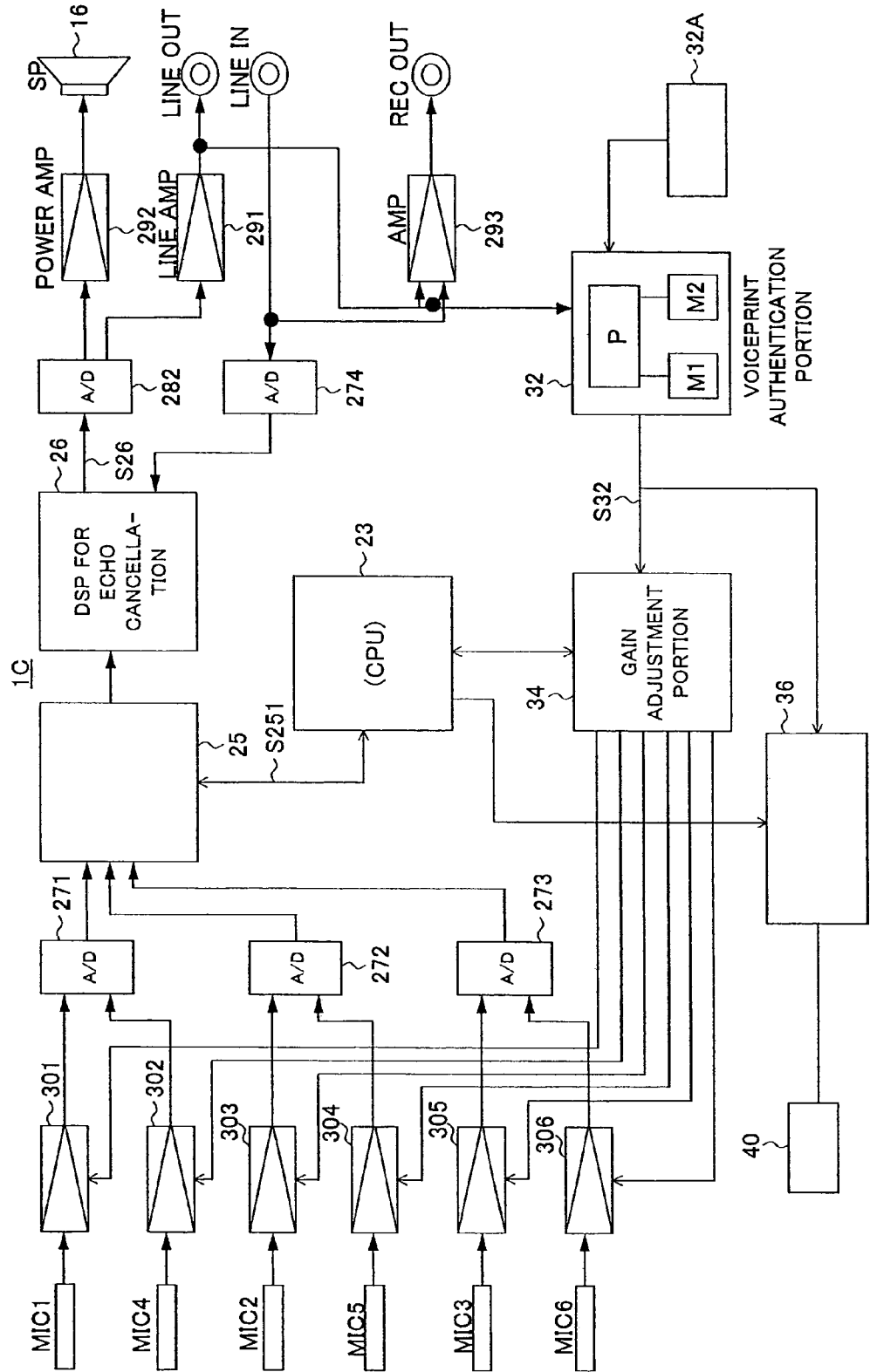
FIG. 26 is a block diagram illustrating the modification of the conference apparatus of the third embodiment.

Therefore, in the third embodiment, conference apparatuses 1B and 1C shown in FIGS. 25 and 26, each having a TV camera set 40 as one embodiment of an imaging means of the present invention and an imaging direction adjustment portion 36 as one embodiment of an imaging direction adjusting mean of the present invention, added to the communication apparatus 1A shown in FIG. 19, are introduced.

FIGS. 25 and 26 are views showing the construction of the conference apparatuses 1B and 1C of the third embodiment of the present invention. FIG. 26 is a view showing the construction of the conference apparatus 1C where the imaging direction adjustment portion 36 and the TV camera set 40 are added to the communication apparatus 1A shown in FIG. 19, and FIG. 25 is a view showing the construction of the conference apparatus 1B where the gain variable type amplifiers 301 to 306 and the amplifier gain adjustment portion 34 are deleted from the conference apparatus 1C shown in FIG. 26.

The third embodiment has the following three modes.

(1) In a first mode, the microphone selection processing by the DSP 25 is in dispensable, as described of the first embodiment, and the imaging direction adjustment portion 36 controls the imaging condition of the TV camera set on the basis of the resultant microphone selection processing.

(2) In a second mode preferable than the first mode, in the structure (configuration) shown in FIG. 25, the microphone selection processing by the DSP 25 is carried out as described in the first embodiment, and further, as described in the second embodiment shown in FIG. 19, the voiceprint authentication by the voiceprint authentication portion 32 is performed and in a case when the result of the microphone selection processing and the voiceprint authentication are matched, then the imaging direction adjustment portion 36 controls the imaging condition of the TV camera set 40.

(3) In a third mode more preferable than the second mode, in the structure shown in FIG. 26, the microphone selection processing by the DSP 25 is carried out as described in the first embodiment, as in the second embodiment shown in FIG. 19, the voiceprint authentication by the voiceprint authentication portion 32 is carried out in a case where the result of the microphone selection processing and the voiceprint authentication is matched, then the imaging direction adjustment portion controls the imaging condition of the TV camera set 40 and further, the gain control of the gain variable type amplifiers 301 to 306 by the amplifier gain adjustment portion 34 is performed.

The third embodiment of the present invention will be described in detail with reference to FIGS. 25 and 26.

The imaging direction adjustment portion 36 includes a computer and can adjust the imaging direction, zoom condition, and illumination condition, etc. A memory portion of the computer of the imaging direction adjustment portion 36 is previously set (stored) a first imaging information for taking a picture, for example, the direction of the first microphone and a first area (region) MIC1 AREA, a second imaging information for taking a picture on, for example, the direction of the second microphone and, a second area MIC2 AREA, etc. Preferably, such the imaging condition information may include the name of the conference attendant, the job name (name of his occupation), his official title, etc.

When the imaging direction adjustment portion 36 gives the imaging condition, such as, the imaging direction, such as upward or downward, left side or right side, the zooming condition (condition of moving zoom lens), whether or not the zooming is carried out, the degree of the zooming, etc, to the TV camera set 40, the TV camera set 40 can take the picture on the basis of the given imaging condition. The image (video) signal taken by the TV camera set 40 is displayed on a display apparatus (device) not shown in the drawings and positioned in this room where the communication apparatus 1A is installed, through a not shown signal transmission path, and will be displayed on a TV receiver installed in remote another room where another communication apparatus 1B is installed.

The amplifier gain adjustment portion 34 and the imaging direction adjustment portion 36 input the microphone selection signal S251 indicating the selected microphone number through the microprocessor 23. Also, the amplifier gain adjustment portion 34 and the imaging direction adjustment portion 36 input the recognition pass signal S32 "1" which is outputted when the selected voice signal S26 which is the picked up voice signal selected by the DSP 25 and processed the echo cancellation by the DSP 26 and outputted, coincides with the voiceprint previously registered after the voiceprint authentication at the voiceprint authentication portion 32.

The amplifier gain adjustment portion 34 sets the gain of the gain variable type amplifier corresponding to the microphone designated by the microphone selection signal S251 at a first large value (high level) as described in the second embodiment. The result is the same as that of the second embodiment.

The imaging direction adjustment portion 36 reads out the imaging condition information previously set to the imaging direction adjustment portion 36, corresponding to the microphone indicated by the microphone selection signal S251 and adjusts the imaging condition of the TV camera set 40 on the basis (in response to) the read imaging condition information. For example, when the microphone selection signal S251 indicates the first microphone, the imaging direction adjustment portion 36 controls the directions of the TV camera set 40, either upward or downward, or right side or left side in response to the first imaging condition information for taking a picture directing the first microphone and the area MIC1_AREA to take the picture of the direction of the first microphone and the area MIC1_AREA. If the first imaging condition information includes the information concerning the zooming, the imaging direction adjustment portion 36 instructs the zooming operation to the TV camera set 40.

The TV camera set 40 takes a picture under the condition instructed by the imaging direction adjustment portion 36. The resultant image (picture) is sent to the TV receiver installed in the another room where the another communication (conference) apparatus is installed through the not shown transmission channel. The resultant image of the TV camera set 40 can also displayed on the display device in the room where the TV camera set 40 and the communication (conference) apparatus are installed.

In this way, on the TV receiver of the remote room and/or the display device in this side room, the picture of the conference attendant by whom the speech issued to the microphone, which is selected by the DSP 25 and of which voice is authenticated by the voiceprint authentication manner of the voiceprint authentication portion 32, can by selectively displayed.

The imaging direction adjustment portion 36 can superimpose the information such as the name, the occupations, etc, included in the imaging condition information on the image signal taken by the TV camera set 40.

As a result, on the display device in the room where the communication apparatus 1B is installed and on the TV receiver in the remote room, the name, the occupation, etc. are displayed in a superimposed form on the image taken by the TV camera set 40.

In an initial state of the conference apparatuses 1B and 1C, for example, at a time immediately after turning on the power of the conference apparatus, the imaging direction adjustment portion 36 instructs the TV camera set 40 so that the TV camera set 40 takes a picture on a position of the microphone in front of the chairman, e.g. an area sitting the chairman, normally an area including the position of the first microphone, or on all the conference attendants and the communication apparatus 1A, for example.

If the selection of the microphone was not suitably carried out, or if the selection of the microphone was suitably carried out, but the voiceprint authentication was not passed (fault), these status are called as a default status (condition or state), and the imaging direction adjustment portion 36 performs a default processing. The imaging direction adjustment portion 36 gives the imaging condition to the TV camera set 40, as the default processing, so that the position of the microphone in front of which the chairman is sitting, or all the conference attendant and the communication apparatus 1A can be pictured, or the current imaging condition can be maintained.

In the default status, the amplifier gain adjustment portion 34 does not adjust the gains of the gain variable type amplifiers 301 to 306.

The imaging direction adjustment portion 36 and the TV camera set 40 will be specifically described. The processing of the amplifier gain adjustment portion 34 was described in the second embodiment and thus omitted their description.

It is supported that the conference attendant A1 sitting at the first microphone direction and area MIC1_AREA speaks to the first microphone MC1. The sound signal picked up by the first microphone MC1 is countered to a digital signal by the A/D converter 271 and inputted to the DSP 25, and the DSP 25 selects the microphone MC1 by the above method. The DSP 25 outputs the microphone selection signal S251 indicating the selection of the first microphone MC1 to the microprocessor 23. The microphone selection signal S251 is applied to the imaging direction adjustment portion 36 by the microprocessor 23. The voice signal picked up by the first microphone MC1 and selected by the DSP 25 is outputted to the DSP 26 to perform the echo cancellation thereat, and the resultant signal, as the selected voice signal S26, is inputted to the voice authentication portion 32 through the D/A converter 282 and the amplifier 291. The voiceprint authentication portion 32 authenticates whether or not the selected voice signal S26 is matched to the voiceprint previously registered in the voiceprint memory M2 in the voiceprint authentication portion 32. If the voiceprint of the conference attendant A1 is matched to the voiceprint previously registered in the voiceprint register memory M2 of the voiceprint authentication portion 32, the voiceprint portion 32 issues the authentication pass signal S32 of "1" indicating the pass (success) of the authentication to the amplifier gain adjustment portion 34 and the imaging direction adjustment portion 36. On the other hand, if the voiceprint of the conference attendant A1 is not registered in the voiceprint register memory M2 in the voiceprint authentication portion 32, the voiceprint authentication portion issues the authentication pass signal S32 of "0" indicating the fault of the authentication to the imaging direction adjustment portion 36.

The imaging direction adjustment portion 36 controls the TV camera set 40 in accordance with the first imaging condition information of the first microphone MC1, indicated by the microphone selection signal S251, when the authentication pass signal S32 of "1" is inputted thereto. As a result, the TV camera set 40 takes a picture of the first microphone direction and area MIC1_AREA to obtain a picture of the conference attendant A1. The imaging direction adjustment portion 36 makes the TV camera set 40 to continue the taking a picture of the first microphone direction and area MIC1_AREA in response to the first imaging condition information during the conference attendant A1 speaks to the first microphone MC1.

Next, it is supposed that the conference attendant A3 speaks to the third microphone MC3, and the DSP 25 selects the speech, but the voiceprint of the third conference attendant A3 is not registered to the voiceprint register memory M2. The DSP 25 issues the microphone selection signal S25 indication the selection of the third microphone MC3 to the imaging direction adjustment portion 36 through the microprocessor 23. Of course, the voice signal picked up by the third microphone MC3 is applied to the DSP26 to carry out the echo cancellation, and the resultant echo cancelled voice signal is applied to the voiceprint authentication portion 32. As described above, the voiceprint of the third conference attendant A3 is not registered to the voiceprint register memory M2, and thus the voiceprint authentication portion 32 outputs the authentication pass signal S32 of "0" indicating the fault of the authentication to the imaging direction adjustment portion 36. Upon receiving the authentication pass signal S32 of "0", the imaging direction adjustment portion 36 judges as the default and carries out the default processing, such as, the continuation of the taking picture by the TV camera set 40 based on the same imaging condition, the taking a picture of the chairman based on the imaging condition for taking the picture of the chairman as the initial status of the conference apparatus, etc. Of course, in this case, the picture of the conference attendant A3 is not taken by the TV camera set 40.

If a plurality of the conference attendants speak at the same time, the DSP 25 selects the most high level sound, the selected voice is checked by the voiceprint authentication, and the imaging direction adjustment portion 36 controls the TV camera set 40 to take a picture on the basis of the resultant voiceprint authentication.

The above operation and processing is same applied to the remote another conference apparatus. Even if the remote another conference apparatus does not have the functions of the voiceprint authentication, etc., then, such the functions can be carried out at this side conference apparatus 1A by receiving the necessity information through the transmission channel, and the imaging direction adjustment portion 36 in this side conference apparatus can control the TV camera set in the remote conference room.

By the conference apparatuses 1B and 1C of the third embodiment, a clear voice is transferred to the remote conference room, the voiceprints of the conference attendants are authenticated, and the picture of the conference attendant voiceprint authenticated is obtained by the TV camera set 40.

In the third embodiment, it is not necessary to provide the microphones for the conference attendants in a manner of 1:1 correspondence, and to control of the imaging condition for the TV camera set 40 by the system administrator such as the chairman.

If the conference attendant moves his position during the conference, the DSP 25 selects the effective microphone by the above mentioned microphone selection processing, and then the voiceprint authentication portion 32 perform the correct voiceprint authentication, consequently, the imaging direction adjustment portion 36. controls the TV camera set 40 to take a effective picture in conjunction with the conference.

The system administrator, or the chairman is free from the operation of the conference apparatus during the conference.

The display device and/or the TV receiver can automatically display the name and occupation of the conference attendant in addition to his picture.

As the preferred example of the third embodiment, with reference to FIGS. 25 and 26, the description was made on the microphone selection by the DSP 25, the voiceprint authentication by the voiceprint authentication portion 32 and the control of the imaging condition of the TV camera set 40 by the imaging direction adjustment portion 36, however, basically, the control of the imaging condition of the TV camera set 40 by the imaging direction adjustment portion 36 can be achieved by using only the microphone selection result by the DSP 25, namely, without the voiceprint authentication.

When realizing the third embodiment, it is not required the microphone arrangement as in the first embodiment, i.e., the arrangement of radial at equal angle. The DSP 25 can selects the microphone outputting the maximum (largest) amplitude of the voice (sound) even if the microphones are not arranged radically and at equal angle, and the voiceprint authentication portion 32 authenticates the matching of the selected voice to the previously registered voiceprint. The combination of the microphone selection and the voiceprint authentication enables the free arrangement of the microphones. In this case, the TV camera set 40 can take a suitable picture on the bases of the imaging condition determined by the imaging direction adjustment portion 36.

For realizing the present invention, the above embodiments can be combined suitably to meet the needs and requirements.

In working the present embodiment, no special device is needed. Only the integral microphone and speaker configuration type communication apparatus need be used. Accordingly, in the state where the integral microphone and speaker configuration type communication apparatus is arranged, the above adjustment can be carried out.

While the invention has been described with reference to specific embodiments chosen for purpose of illustration, it should be apparent that numerous modifications could be made thereto by those skilled in the art without departing from the basic concept and scope of the invention.

What is claimed is:

1. A communication apparatus comprising:
   a plurality of microphones;
   a microphone signal selecting means for selecting a signal among a plurality of signals picked up by the plurality of microphones;
   sensitivity difference adjustment means for adjusting acoustic couplings between a receiving and reproduction speaker and the plurality of microphones to equal values,
   wherein said microphone signal selecting means selects and switches to one of said plurality of microphones so that only the signal from said selected microphone is transmitted,
   wherein said microphone signal selecting means selects one of said plurality of microphones which directly faces a speaking party and an LED in the vicinity of said selected microphone illuminates; and
   an imaging direction adjusting means for controlling an imaging condition of an imaging means in response to an imaging condition information corresponding to a microphone picked up the signal selected by the microphone signal selecting means.

2. A communication apparatus according to claim 1, wherein
   the imaging condition information includes information indicating the imaging direction of the imaging means, and
   the imaging direction adjusting means controls the imaging direction of the imaging means in response to the information indicating the imaging direction.

3. A communication apparatus according to claim 2, wherein
   the imaging condition information includes information for zooming the imaging means, and
   the imaging direction adjusting means controls the zoom of the imaging means in response to the information for zooming the imaging means.

4. A communication apparatus according to claim 2, wherein
   the imaging condition information includes information indicating a speaker positioned at a portion where the imaging means takes a picture, and
   the imaging direction adjusting means adds the information indicating the speaker to the picture taken by the imaging means.

5. A communication apparatus according to claim 2, further comprising a voiceprint authenticating means for carrying out a voiceprint authentication whether or not the selected microphone pick-up signal coincides with a previously registered voiceprint.

6. A communication apparatus according to claim 5, wherein the plurality of microphones are arranged radially at equal angle,
   further comprising a sound outputting means arranged at equal distance to the plurality of microphones and adjacent to the plurality of microphones.

7. A communication apparatus according to claim 5, wherein the microphone signal selecting means detects a sound source direction from the signal detected by the microphone.

8. A communication apparatus according to claim 2, wherein the plurality of microphones are arranged radially at equal angle,
   further comprising a sound outputting means arranged at equal distance to the plurality of microphones and adjacent to the plurality of microphones.

9. A communication apparatus according to claim 2, wherein the microphone signal selecting means detects a sound source direction from the signals detected by the microphones.

10. A communication apparatus according to claim 1, further comprising a voiceprint authenticating means for carrying out a voiceprint authentication whether or not the selected microphone pick-up signal coincides with a previously registered voiceprint.

11. A communication apparatus according to claim 10, wherein the imaging direction adjusting means controls the imaging condition of the imaging means in response to the imaging condition information corresponding to the microphone picked up the signal selected by the microphone signal selecting means.

12. A communication apparatus according to claim 11, wherein the imaging direction adjusting means sets a status of the imaging means to a default status when the voiceprint authenticating means does not authenticate the selected microphone pick-up signal.

13. A communication apparatus according to claim 12, wherein the imaging direction adjusting means does not change the imaging condition of the imaging means when set as the default status.

14. A communication apparatus according to claim 12, wherein the imaging direction adjusting means sets the imaging condition of the imaging means to an initial imaging condition when set as the default status.

15. A communication apparatus according to claim 14, wherein the imaging direction adjusting means sets the imaging condition of the imaging means to an imaging condition for taking a picture of a chairman previously registered, as the initial imaging condition.

16. A communication apparatus according to claim 10, further comprising a gain variable type amplifying means for amplifying the signal picked up by the microphone and having a variable gain, and an amplifier gain adjusting means,
   the amplifier gain adjusting means setting a gain of the gain variable type amplifying means corresponding to the microphone indicating the selected signal to a first gain having a large value, when the voiceprint authenticating means authenticates the selected microphone pick-up signal.

17. A communication apparatus according to claim 16, wherein the amplifier gain adjusting means sets the gain of the gain variable type amplifying means corresponding to the microphone indicating the selected signal to a second gain having a small value, when the voiceprint authenticating means does not authenticate the selected microphone pick-up signal.

18. A communication apparatus according to claim 17, wherein the amplifier gain adjusting means sets the gain of the gain variable type amplifying means corresponding to the microphone indicating the selected signal to a third gain having an average and equal to a gain of other gain variable type amplifying means, when the termination of the microphone selection by the microphone signal selecting means is detected.

19. A communication apparatus according to claim 16, wherein the amplifier gain adjusting means sets the gain of the gain variable type amplifying means corresponding to the microphone indicating the selected signal to a third gain having an average and equal to a gain of other gain variable type amplifying means, when the termination of the microphone selection by the microphone signal selecting means is detected.

20. A communication apparatus according to claim 1, wherein the plurality of microphones are arranged radially at equal angle,
further comprising a sound outputting means arranged at equal distance to the plurality of microphones and adjacent to the plurality of microphones.

21. A communication apparatus according to claim 1, wherein the microphone signal selecting means detects a sound source direction from the signal detected by the microphone.

22. A conference apparatus comprising:
a plurality of microphones;
an imaging means adjustable an imaging condition:
a microphone signal selecting means for selecting a signal among a plurality of signals picked up by the plurality of microphones;
sensitivity difference adjustment means for adjusting acoustic couplings between a receiving and reproduction speaker and the plurality of microphones to equal values,
wherein said microphone signal selecting means selects and switches to one of said plurality of microphones so that only the signal from said selected microphone is transmitted,
wherein said microphone signal selecting means selects one of said plurality of microphones which directly faces a speaking party and an LED in the vicinity of said selected microphone illuminates; and
an imaging direction adjusting means for controlling an imaging condition of an imaging means in response to an imaging condition information corresponding to a microphone picked up the signal selected by the microphone signal selecting means.

23. A method of adjusting an imaging condition including:
a step of selecting a signal among a plurality of signals picked up by a plurality of microphones;
a sensitivity difference adjustment step of adjusting acoustic couplings between a receiving and reproduction speaker and the plurality of microphones to equal values,
wherein said selecting step selects and switches to one of said plurality of microphones so that only the signal from said selected microphone is transmitted,
wherein selecting step selects one of said plurality of microphones which directly faces a speaking party and an LED in the vicinity of said selected microphone illuminates; and
a step of controlling an imaging condition of an imaging means in response to an imaging condition information corresponding to a microphone picked up the signal selected in the selecting step.

24. A method of adjusting an imaging condition according to claim 23, further including a voiceprint authenticating step for carrying out a voiceprint authentication whether or not the selected microphone pick-up signal coincides with a previously registered voiceprint,
wherein in the imaging direction adjusting step, the imaging condition of the imaging means is controlled in response to the imaging condition information corresponding to the microphone picked up the signal selected by the microphone signal selecting means.

* * * * *